United States Patent
Jinda et al.

(10) Patent No.: US 9,489,912 B2
(45) Date of Patent: Nov. 8, 2016

(54) LIQUID CRYSTAL DISPLAY APPARATUS AND METHOD FOR DRIVING LIQUID CRYSTAL DISPLAY APPARATUS

(71) Applicant: Sharp Kabushiki Kaisha, Osaka (JP)

(72) Inventors: Akihito Jinda, Osaka (JP); Mitsuhiro Murata, Osaka (JP); Kohhei Tanaka, Osaka (JP); Yosuke Iwata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 23 days.

(21) Appl. No.: 14/411,940

(22) PCT Filed: Jul. 1, 2013

(86) PCT No.: PCT/JP2013/067982
§ 371 (c)(1),
(2) Date: Dec. 30, 2014

(87) PCT Pub. No.: WO2014/007193
PCT Pub. Date: Jan. 9, 2014

(65) Prior Publication Data
US 2015/0170600 A1 Jun. 18, 2015

(30) Foreign Application Priority Data
Jul. 5, 2012 (JP) .................................. 2012-151397

(51) Int. Cl.
*G09G 5/00* (2006.01)
*G09G 3/36* (2006.01)
*G02F 1/1343* (2006.01)

(52) U.S. Cl.
CPC ....... *G09G 3/3696* (2013.01); *G02F 1/134363* (2013.01); *G09G 3/3659* (2013.01); *G02F 2001/134381* (2013.01); *G09G 2300/0426* (2013.01); *G09G 2300/0434* (2013.01)

(58) Field of Classification Search
CPC ............. G09G 3/3655; G09G 3/3659; G09G 3/3696; G09G 2300/0434; G09G 2300/0426; G02F 1/134363
USPC .................................................. 345/206, 103
See application file for complete search history.

(56) References Cited

U.S. PATENT DOCUMENTS

| | | | | |
|---|---|---|---|---|
| 2003/0052847 | A1* | 3/2003 | Okishiro | G02F 1/134363 345/87 |
| 2003/0227429 | A1* | 12/2003 | Shimoshikiryo | G02F 1/134336 345/90 |
| 2006/0208998 | A1* | 9/2006 | Okishiro | G09G 3/3406 345/102 |

FOREIGN PATENT DOCUMENTS

JP 2004-354407 A 12/2004

*Primary Examiner* — Towfiq Elahi
(74) *Attorney, Agent, or Firm* — Chen Yoshimura LLP

(57) ABSTRACT

Provided is a liquid crystal display apparatus employing a drive method whereby nonuniform electric field is not generated in pixels. This liquid crystal display apparatus is provided with a first substrate, a first electrode, a second electrode, a second substrate, a common electrode, a counter electrode, a liquid crystal layer, and a drive unit. The drive unit executes drive operations including: operations of setting the potential of the first electrode at a low level, the potential of the second electrode at a high level, and the potential of the counter electrode at the high level; operations of setting the potential at the high level, the potential at the low level, and the potential at the high level; operations of setting the potential at the low level, the potential at the high level, and the potential at the low level; and operations of setting the potential at the high level, the potential at the low level, and the potential at the low level.

12 Claims, 16 Drawing Sheets

| | | Uneven Luminance | Burn-in |
|---|---|---|---|
| Comparison Example | No Overcoat | >10 | ND10 |
| Driving Method 1 | No Overcoat | ≤10 | – |
| | With Overcoat | ≤10 | ND5 |
| Driving Method 2 | No Overcoat | ≤10 | – |
| | With Overcoat | ≤10 | ND5 |

LIQUID CRYSTAL DISPLAY APPARATUS AND METHOD FOR DRIVING LIQUID CRYSTAL DISPLAY APPARATUS

TECHNICAL FIELD

The present invention is related to a liquid crystal display device and a method of driving the same.

BACKGROUND ART

Conventionally, various methods of driving liquid crystal display devices have been known.

A liquid crystal display device disclosed in Japanese Patent Application Laid-Open Publication No. 2004-354407 has a first electrode and a second electrode provided on a substrate and a third electrode provided on another substrate. This liquid crystal display device changes the potential of the third electrode within one frame frequency, and drives liquid crystal molecules by using the horizontal electric field generated between the first and second electrodes during the image display period, and by using the vertical electric field generated between the first and third electrodes in the initial stage of the image non-display period. The patent document discloses that the fall time, in particular, can be reduced through this driving method.

RELATED ART DOCUMENT

Patent Document

Patent Document 1: Japanese Patent Application Laid-Open Publication No. 2004-354407

SUMMARY OF THE INVENTION

Problems to be Solved by the Invention

The driving method disclosed in the patent document is a driving method having an image non-display period within one frame period, or in other words, a method of driving by black insertion. Therefore, it is difficult to obtain sufficient brightness.

In the configuration disclosed in the patent document, there is both a black display in which the liquid crystal molecules are horizontally oriented, and a black display in which the liquid crystal molecules are vertically oriented. Therefore, compensation of the black display cannot take place, and thus, the contrast decreases.

In addition, in the configuration disclosed in the patent document, out of the first and second electrodes that form the horizontal electric field, the second electrode is the common electrode. In the initial stage of the image non-display period, an electric field is generated between the first and third electrodes. In other words, the configurations of the first electrode and the second electrode are asymmetrical. As a result, electric field deviation occurs within a pixel which can cause uneven brightness and burn-in.

The object of the present invention is to provide a driving method that does not cause electric field deviation within a pixel, and to provide a liquid crystal display device that performs the driving method.

Means for Solving the Problems

The liquid crystal display device having a plurality of pixels disclosed here includes: a first substrate; a first electrode formed on the first substrate in each of the plurality of pixels; a second electrode formed on the first substrate in each of the plurality of pixels; a second substrate disposed so as to face the first substrate, the opposite electrode being shared by at least some of the plurality of pixels; an opposite electrode formed on one of the first and second substrates; a common electrode formed on another of the first and second substrates, the common electrode being shared by the plurality of pixels; a liquid crystal layer sandwiched between the first and second substrates, the liquid crystal layer including liquid crystal molecules having a positive birefringence; and a driving unit that controls the potential of the first electrode, the second electrode, and the opposite electrode. The driving unit performs driving operations during a unit period, the driving operations including: a first driving operation in which a potential of the first electrode is made lower than a reference potential, a potential of the second electrode is made higher than the reference potential, and a potential of the opposite electrode is made higher than the reference potential, a second driving operation in which the potential of the first electrode is made higher than the reference potential, the potential of the second electrode is made lower than the reference potential, and the potential of the opposite electrode is made higher than the reference potential, a third driving operation in which the potential of the first electrode is made lower than the reference potential, the potential of the second electrode is made higher than the reference potential, and the potential of the opposite electrode is made lower than the reference potential, a fourth driving operation in which the potential of the first electrode is made higher than the reference potential, the potential of the second electrode is made lower than the reference potential, and the potential of the opposite electrode is made lower than the reference potential.

A driving method disclosed here of a liquid crystal display device having a plurality of pixels, the liquid crystal display device including a first substrate, a first electrode formed on the first substrate in each of the plurality of pixels, a second electrode formed on the first substrate in each of the plurality of pixels, a second substrate disposed so as to face the first substrate, an opposite electrode formed on one of the first and second substrates, the opposite electrode being shared by at least some of the plurality of pixels, a common electrode formed on another of the first and second substrates, the common electrode being shared by the plurality of pixels, and a liquid crystal layer sandwiched between the first and second substrates, the method including: executing a first driving operation in which a potential of the first electrode is made lower than a reference potential, a potential of the second electrode is made higher than the reference potential, and a potential of the opposite electrode is made higher than the reference potential; executing a second driving operation in which a potential of the first electrode is made higher than the reference potential, the potential of the second electrode is made lower than the reference potential, and the potential of the opposite electrode is made higher than the reference potential; executing a third driving operation in which a potential of the first electrode is made lower than a reference potential, the potential of the second electrode is made higher than the reference potential, and the potential of the opposite electrode is made lower than the reference potential; and executing a fourth driving operation in which a potential of the first electrode is made higher than the reference potential, the potential of the second electrode is made lower than the reference potential, and the potential of the opposite electrode is made lower than the reference potential, wherein the first driving operation, the second driving operation, the third driving operation, and the fourth driving operation are executed during a unit period.

Effects of the Invention

According to the present invention, a driving method that does not cause electric field deviation within a pixel can be obtained. Additionally, a liquid crystal display device that executes the driving method can be obtained.

DETAILED DESCRIPTION OF EMBODIMENTS

Figure 1:
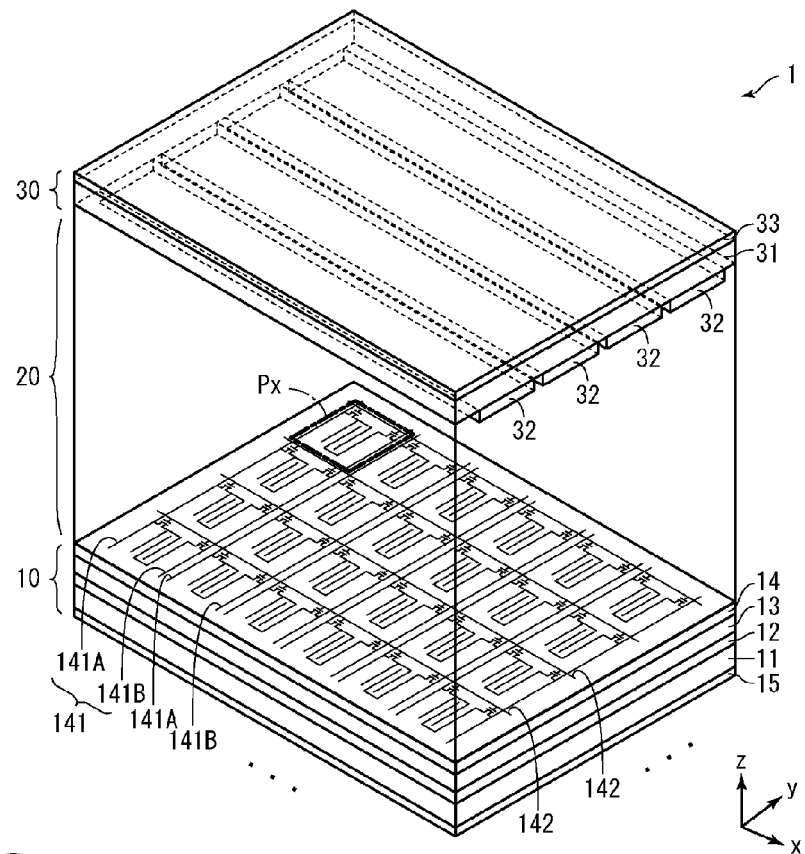
FIG. 1 is a perspective view schematically showing a portion of a liquid crystal display device of Embodiment 1 of the present invention.

The liquid crystal display device having a plurality of pixels according to Embodiment 1 of the present invention includes: a first substrate; a first electrode formed on the first substrate in each of the plurality of pixels; a second electrode formed on the first substrate; a second substrate disposed so as to face the first substrate; an opposite electrode formed on one of the first and second substrates, the opposite electrode being shared by at least some of the plurality of pixels; a common electrode formed on another of the first and second substrates, the common electrode being shared by the plurality of pixels; a liquid crystal layer sandwiched between the first and second substrates, the liquid crystal layer including liquid crystal molecules having a positive birefringence; and a driving unit that controls the potential of the first electrode, the second electrode, and the opposite electrode, wherein the driving unit executes driving operations during a unit period, the driving operations including: a first driving operation in which a potential of the first electrode is made lower than a reference potential, a potential of the second electrode is made higher than the reference potential, and a potential of the opposite electrode is made higher than the reference potential, a second driving operation in which the potential of the first electrode is made higher than the reference potential, the potential of the second electrode is made lower than the reference potential, and the potential of the opposite electrode is made higher than the reference potential, a third driving operation in which the potential of the first electrode is made lower than the reference potential, the potential of the second electrode is made higher than the reference potential, and the potential of the opposite electrode is made lower than the reference potential, a fourth driving operation in which the potential of the first electrode is made higher than the reference potential, the potential of the second electrode is made lower than the reference potential, and the potential of the opposite electrode is made lower than the reference potential (first configuration).

According to the configuration above, the driving unit executes a first driving operation, a second driving operation, a third driving operation, and a fourth driving operation during the unit period. During the first driving operation and the fourth driving operation, the difference in potential between the first electrode and the opposite electrode becomes relatively larger and the difference in potential between the second electrode and the opposite electrode becomes relatively smaller. On the other hand, during the second driving operation and the third driving operation, the difference in potential between the first electrode and the opposite electrode becomes relatively smaller and the difference in potential between the second electrode and the opposite electrode becomes relatively larger. Electric field deviation is reduced by executing the first driving operation, the second driving operation, the third driving operation, and the fourth driving operation during a unit period.

Additionally, between the first driving operation and the fourth driving operation, and between the second driving operation and the third driving operation, the high potential and the low potential between the respective electrodes are reversed. By executing the first driving operation, the second driving operation, the third driving operation, and the fourth driving operation, the direction of the electric field of the liquid crystal layer is reversed, and thus, deviation in the electric charge of the liquid crystal layer can be prevented. The first driving operation, the second driving operation, the third driving operation, and the fourth driving operation do not need to be executed in this order.

In the first configuration, it is preferable that the absolute value of the difference in potential between the first electrode and the common electrode be equal to the absolute value of the difference in potential between the second electrode and the common electrode (second configuration).

According to the configuration mentioned above, the electric field can be made symmetrical.

In the first and second configurations, it is preferable that the absolute value of the difference in potential between the opposite electrode and the common electrode be constant (third configuration).

According to the configuration mentioned above, the strength of the electric field formed by the opposite electrode and the common electrode is constant. Therefore, flickers can be suppressed from occurring.

In any one of the first to third configurations mentioned above, the potential of the common electrode and the reference potential may be equal (fourth configuration).

In any one of the first to fourth configurations, it is preferable that the potential of the common electrode be constant (fifth configuration).

According to the configuration mentioned above, the driving unit can change just the potential of the opposite electrode to control the difference in potential between the opposite electrode and the common electrode. As a result, even if the first and second electrodes are driven in a line-sequential manner or in a dot-sequential manner, there is no need to form a common electrode for each of the first and second electrodes.

In any one of the first to fifth configurations, the opposite electrode may further include an overcoat layer formed so as to cover the opposite electrode.

According to the configuration mentioned above, the strength of the vertical electric field formed by the opposite electrode and the common electrode becomes weaker due to the overcoat layer. As a result, the relative effect of the horizontal electric field formed by the first and second electrodes becomes larger. As a result, the transmittance can be improved.

The liquid crystal display device according to any one of the first to sixth configurations, may further include: a plurality of pixels arranged in a matrix, wherein the first electrode and the second electrode are formed in each of the plurality of pixels, wherein the opposite electrode is formed for each row of the plurality of pixels, and wherein the driving unit executes the driving operations for each row of the plurality of pixels.

It is preferable that the liquid crystal display device according to the seventh configuration, further include: a gate line formed for each row of the plurality of pixels, wherein the first electrode and the second electrode formed in one of the plurality of pixels are electrically connected to one of the gate lines through respective switching elements.

According to the configuration, the first electrode and the second electrode share one gate line through respective switching elements. Compared to forming a gate line for each of the first electrode and the second electrode, the aperture ratio can be increased by reducing the number of wiring lines. Additionally, the timing of applying a potential to the first and second electrodes can be made to match.

In any one of the first to eighth configurations, the first driving operation, the second driving operation, the third driving operation, and the fourth driving operation may be executed in this order (ninth configuration).

According to the configuration mentioned above, the length of the cycle up to when the electric field formed between the first and second electrodes reverses direction is approximately half the length of the cycle up to when the electric field formed between the opposite electrode and the common electrode reverses direction. By shortening the length of the cycle up to when the electric field reverses direction, flickering becomes harder to perceive.

In any one of the first to eighth configurations, the driving unit may execute the first driving operation, the second driving operation, the third driving operation, and the fourth driving operation in this order (tenth configuration).

According to the configuration mentioned above, the length of the cycle up to when the electric field formed between the opposite electrode and the common electrode reverses is approximately half the length of the cycle up to when the electric field formed between the first and second electrodes reverses. By shortening the length of the cycle up to when the electric field reverses, flickering becomes harder to perceive.

In any one of the first to tenth configurations, the unit period may include two frame periods (eleventh configuration).

A driving method according to Embodiment 1 of the present invention of a liquid crystal display device having a plurality of pixels, the liquid crystal display device including a first substrate, a first electrode formed on the first substrate in each of the plurality of pixels, a second electrode formed on the first substrate in each of the plurality of pixels, a second substrate disposed so as to face the first substrate, an opposite electrode formed on one of the first and second substrates, the opposite electrode being shared by at least some of the plurality of pixels, a common electrode formed on another of the first and second substrates, and a liquid crystal layer sandwiched between the first and second substrates, the method including: executing a first driving operation in which a potential of the first electrode is made lower than a reference potential, a potential of the second electrode is made higher than the reference potential, and a potential of the opposite electrode is made higher than the reference potential; executing a second driving operation in which a potential of the first electrode is made higher than the reference potential, the potential of the second electrode is made lower than the reference potential, and the potential of the opposite electrode is made higher than the reference potential; executing a third driving operation in which a potential of the first electrode is made lower than a reference potential, the potential of the second electrode is made higher than the reference potential, and the potential of the opposite electrode is made lower than the reference potential; and executing a fourth driving operation in which a potential of the first electrode is made higher than the reference potential, the potential of the second electrode is made lower than the reference potential, and the potential of the opposite electrode is made lower than the reference potential, wherein the first driving operation, the second driving operation, the third driving operation, and the fourth driving operation are executed during a unit period (first configuration of driving method).

In the first configuration of the driving method, the liquid crystal layer may include liquid crystal molecules having positive birefringence (second configuration of driving method).

Embodiments

Embodiments of the present invention will be described in detail below with reference to the drawings. Portions in the drawings that are the same or similar are assigned the same reference characters and descriptions thereof will not be repeated. For ease of description, drawings referred to below show simplified or schematic configurations, and some of the components are omitted. Components shown in the drawings are not necessarily to scale.

Liquid Crystal Display Device

FIG. 1 is a perspective view schematically showing a portion of a liquid crystal display device 1 of Embodiment 1 of the present invention. The liquid crystal display device 1 has an array substrate (first substrate) 10, an opposite substrate (second substrate) 30, and a liquid crystal layer 20 sandwiched between the array substrate 10 and the opposite substrate 30.

The array substrate 10 includes the substrate 11. The substrate 11 is light-transmissive. The substrate 11 is a glass substrate, for example. The substrate 11 may have a passivation film or the like formed on the surface. A polarizing plate 15 is disposed on one surface of the substrate 11. On another surface of the substrate 11, a common electrode 12, an insulating layer 13, and an array layer 14 are formed in this order.

The common electrode 12 is formed covering substantially the entire surface of the display area of the substrate 11 in an even planar form. The common electrode 12 is a light-transmissive conductive film, and is an ITO (indium tin oxide) or IZO (indium zinc oxide) film, for example. The common electrode 12 is formed by sputtering or CVD (chemical vapor deposition), for example.

The insulating layer 13 is formed so as to cover substantially an entire surface of the common electrode 12. The insulating layer 13 has transmissive characteristics and insulating characteristics. The insulating layer 13 is a silicon nitride film, a silicon oxide film, or a silicon oxynitride film, and can be formed by CVD, for example. The insulating film 13 may be an organic material such as an acrylic resin, and in this case, the insulating film 13 is formed by spin coating or slit coating, for example.

The array layer 14 includes a plurality of pixels Px respectively having pixel electrodes. The array layer 14 further includes wiring lines (source lines 141 and gate lines 142) for supplying signals to the pixel electrodes and switching elements.

The source lines 141 are formed parallel to each other with a prescribed gap therebetween. The gate lines 142 are formed in a direction intersecting with the source lines 141 so as to be formed parallel to each other with a prescribed gap therebetween. It is preferable that the source lines 141 and the gate lines 142 have high conductivity. The source lines 141 and the gate lines 142 are metal films, for example.

Below, as shown in FIG. 1, the direction in which the gate lines 142 extend is referred to as the x direction, and the direction in which the source lines 141 extend is referred to as the y direction. The direction normal to the substrate 11 is referred to as the z direction. The pixels Px are arranged in a matrix along the x direction and the y direction. Therefore, in some cases, a group including a plurality of pixels Px in the same position in the x direction is referred to as a column of the pixels Px. In addition, in some cases, a pair of a plurality of pixels Px in the same position in the y direction is referred to as a row of the pixels Px.

Figure 2:
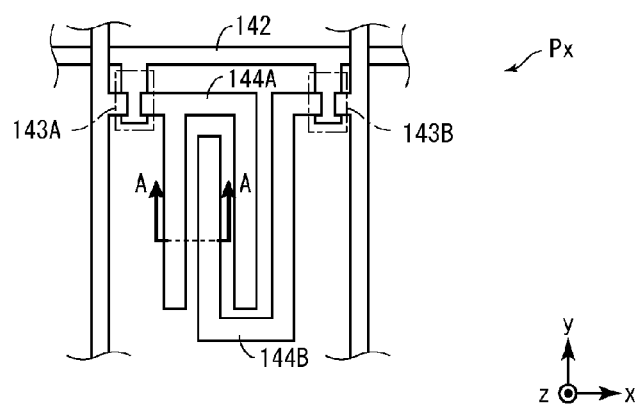
FIG. 2 is a plan view showing one pixel taken from the liquid crystal display device.

FIG. 2 is a plan view showing a pixel Px taken from the liquid crystal display device 1. One pixel Px has two source lines 141A and 141B, and one gate line 142 passing through. The pixel Px further includes TFTs (thin film transistor) 143A and 143B that are switching elements, and electrodes 144A (first electrode) and 144B (second electrode) that are pixel electrodes.

The TFTs 143A are formed in a vicinity of the intersections of the respective source lines 141A and the gate lines 142. The sources of the TFTs 143A are connected to the respective source lines 141A, and the gates are connected to the respective gate lines 142, and the drains are connected to the respective electrodes 144A. The TFTs 143B are formed in a vicinity of the intersections of the respective source lines 141B and the gate lines 142. The sources of the TFTs 143B are connected to the respective source lines 141B, and the gates are connected to the respective gate lines 142, and the drains are connected to the respective electrodes 144B. In other words, the TFTs 143A and 143B share the gate line 142. The aperture ratio can be increased compared to a case in which a gate line is formed for each of the TFTs 143A and 143B. The timing of operating the TFTs 143A and 144B can be matched.

The TFTs 143A and 143B are formed of amorphous silicon, polysilicon, or IGZO (indium gallium zinc oxide), for example.

The electrodes 144A and 144B are in a so-called comb shape. In other words, the electrodes 144A and 144B have main bodies having a plurality of branches, and connecting parts that connect the main bodies to each other. In an example shown in FIG. 2, the electrode 144A has two main bodies that extend along the y direction and are disposed in parallel with each other, and a connecting portion that connects the main bodies to each other at one end portion in the y direction of each of the main bodies. In a similar manner, the electrode 144B is formed of two main bodies that extend along the y direction and are disposed in parallel with each other, and a connecting portion that connects the main bodies to each other at one end portion in the y direction of each of the main bodies. This configuration is merely an example, and the electrodes 144A and 144B can have different shapes.

The main bodies of the electrodes 144A and 144B are arranged alternately. According to this structure, a difference in potential between the electrodes 144A and 144B is formed, and an electric field can be formed within the xy in-plane direction. In the example shown in FIG. 2, the main bodies of the electrodes 144A and 144B are arranged alternately along the x direction. According to this structure, an electric field can be formed in the x direction.

The electrodes 144A and 144B are conductive films and are metal films such as Al or Cu, for example. The electrodes 144A and 144B may be transparent conductive films such as ITO or IZO.

FIGS. 1 and 2 show that the source lines 141A and 141B, the gate lines 142, the TFTs 143A and 143B, and the electrodes 144A and 144B are formed in the same layer. However, these may be formed in a plurality of layers across an insulating film or the like. In other words, the array layer 14 may include a plurality of films formed in different positions along the z direction. The array layer 14 can be manufactured through a known semiconductor process.

More descriptions will be made based on FIG. 1. The opposite substrate 30 includes the substrate 31. The substrate 31 has similar light-transmissive characteristics to the substrate 11. The substrate 31 is a glass substrate, for example. The substrate 31 may have a passivation film or the like formed on the surface. A polarizing plate 33 is disposed on one surface of the substrate 31. Opposite electrodes 32 are formed on another surface of the substrate 31.

The opposite electrodes 32 are formed for each row of the pixels Px. More specifically, the respective opposite electrodes 32 are formed in a band-shape extending in the same direction (x direction) as the gate lines 142. A plurality of opposite electrodes 32 are formed parallel to each other in the y direction so as to correspond with the gate lines 142.

The opposite electrodes 32 are transmissive conductive films that are ITO or IZO, for example. The opposite electrodes 32 are formed by CVD or sputtering, for example, and are patterned by photolithography.

The liquid crystal display device 1 is manufactured by sealing the periphery of the array substrate 10 and the opposite substrate 30 with the liquid crystal layer 20 therebetween. As shown in FIG. 1, the array substrate 10 and the opposite substrate 30 are disposed such that the array layer 14 and the opposite electrode 32 face each other. Although not shown in FIG. 1, alignment films are respectively formed so as to cover the array layer 14 and the opposite electrodes 32.

The liquid crystal molecules of the liquid crystal layer 20 have birefringence. In other words, the refractive index $n_e$ of light that oscillates in parallel with the optical axis differs from the refractive index $n_o$ of light that oscillates perpendicular to the optical axis. In the liquid crystal display device 1, liquid crystal molecules having a positive birefringence $\Delta n = n_e - n_o$ are used. It is preferable that the birefringence $\Delta n$ of the liquid crystal molecules be large.

Figure 3:
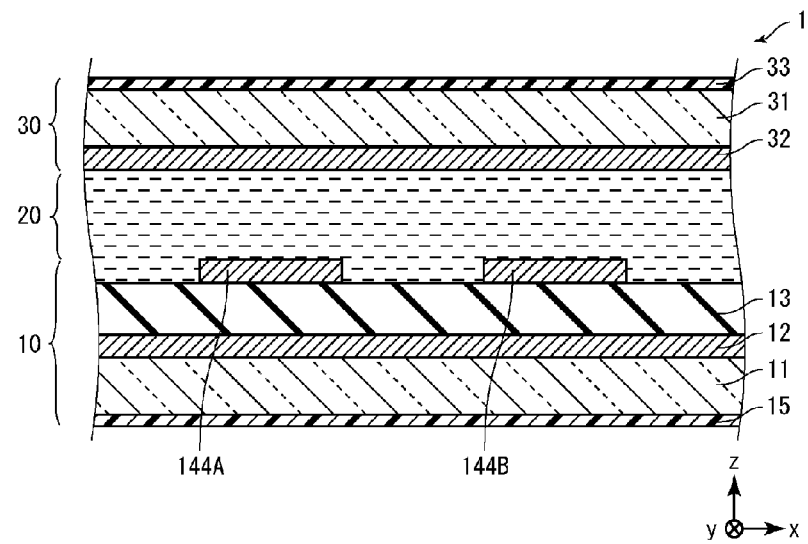
FIG. 3 is a cross-sectional view along the line A-A of FIG. 2.
Figure 4:
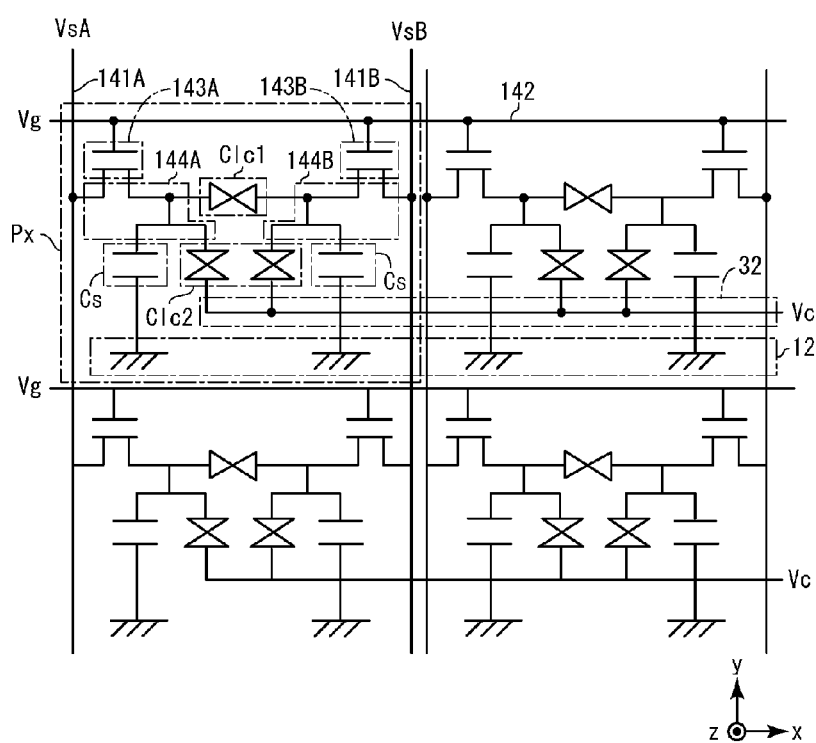
FIG. 4 is a top view of an equivalent circuit diagram of the liquid crystal display device.

FIG. 3 is a cross-sectional view along the line A-A of FIG. 2. FIG. 4 is an equivalent circuit diagram of the liquid crystal display device 1. As shown in FIG. 4, the electrodes 144A and 144B are capacitively coupled through the liquid crystal capacitance Clc1. The electrodes 144A and the opposite electrodes 32, and the electrodes 144B and the opposite electrodes 32 are capacitively coupled through the liquid crystal capacitance Clc2. The electrodes 144A and the common electrode 12, and the electrodes 144B and the common electrode 12 are respectively capacitively coupled through the storage capacitance Cs.

As shown in FIG. 4, a signal VsA is supplied to the source line 141A and a signal VsB is supplied to the source line 141B. A signal Vg is supplied to the gate line 142, and the signal Vc is supplied to the opposite electrode 32. Details of the signals VsA, VsB, Vg, and Vc will be described later.

The potential of the common electrode 12 of the liquid crystal display device 1 is kept constant. In the example shown in FIG. 4, the potential of the common electrode 12 is a ground potential, but the potential may be different from a ground potential. The configuration may have a signal line connected to the common electrode 12 as well, and the potential of the common electrode 12 can be controlled.

A general description of the display operation of the liquid crystal display device 1 will be described with reference to FIGS. 5A and 5B.

The liquid crystal molecules 20a of the liquid crystal layer 20 have a positive birefringence $\Delta n$ and are aligned such that the direction of the long axis of the molecules and the direction of the electric field are parallel to each other. The liquid crystal display device 1 controls the potential of the electrodes 144A and 144B, the opposite electrodes 32, and the common electrode 12, and applies an electric field to the liquid crystal layer 20 and controls the alignment direction of the liquid crystal molecules 20a. In the liquid crystal display device 1, an alignment film for vertical alignment is used. As a result, if the electric field is not applied to the liquid crystal layer 20, the liquid crystal molecules 20a are aligned such that the long axis of the molecules is aligned with the z axis.

Below, the electric field formed by the electrodes 144A and 144B is referred to as the horizontal electric field and the electric field formed by the common electrode 12 and the opposite electrode 32 is referred to as the vertical electric field.

Figure 5A:
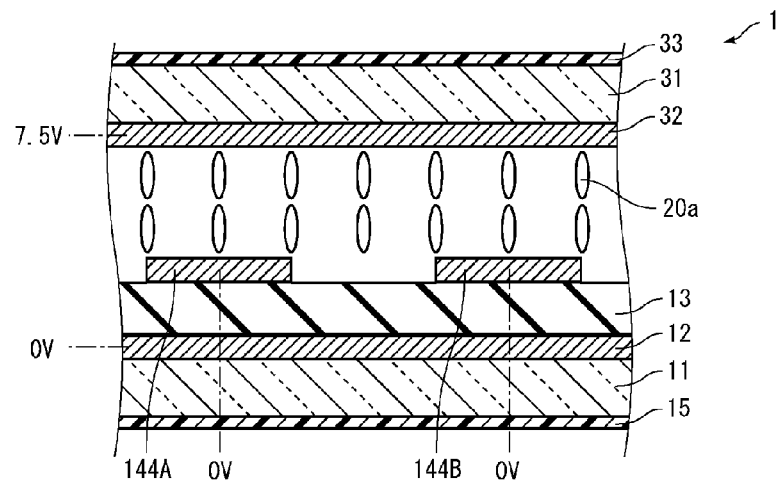
FIG. 5A is a drawing for describing the display operation of the liquid crystal display device.

FIG. 5A is a schematic view of a state in which only the vertical electric field is formed and not the horizontal electric field. In the example shown in FIG. 5A, the potential of the opposite electrode 32 is 7.5V and the potential of the electrodes 144A and 144B and the common electrode 12 is 0V.

In FIG. 5A, the liquid crystal molecules 20a are aligned such that the long axis of the molecules is in parallel with the z direction due to the vertical electric field and the alignment films 15 and 33. At this time, the polarizing direction of the light that passes through the liquid crystal layer 20 is mostly unchanged. The polarizing plates 15 and 33 are disposed such that the transmission axes intersect with each other. Therefore, the light that passes through the polarizing plate 15 and the liquid crystal layer 20 is blocked by the polarizing plate 33. Thus, black display (dark display) is performed for pixels Px such as those shown in FIG. 5A where a horizontal electric field is not formed.

Figure 5B:
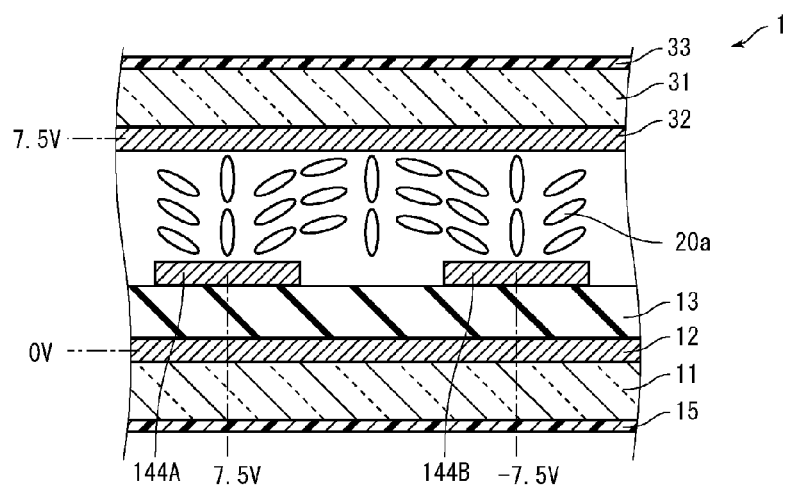
FIG. 5B is a drawing for describing the display operation of the liquid crystal display device.

FIG. 5B schematically shows a state in which a horizontal electric field is formed in addition to a vertical electric field. In the example shown in FIG. 5B, the potential of the opposite electrode 32 is 7.5V, the potential of the electrode 144A is 7.5V, the potential of the electrode 144B is −7.5V, and the potential of the common electrode 12 is 0V.

In FIG. 5B, the liquid crystal molecules 20a are aligned such that the long axes of the molecules are inclined from the z direction towards the xy plane. At this time, the polarizing direction of the light that passes through the liquid crystal layer 20 changes according to the birefringence of the liquid crystal molecules 20a. As a result, the light that passes through the polarizing plate 15 and the liquid crystal layer 20 can pass through the polarizing plate 33. Thus, white display (light display) is performed for pixels Px such as those shown in FIG. 5B where a horizontal electric field is formed.

In this manner, the liquid crystal display device 1 can control the gradation of the pixels Px through the strength of the horizontal electric field. In the liquid crystal display device 1, a vertical electric field is formed both when black display is performed and when white display is performed. The response speed when the display switches from white display to black display can be improved by the vertical electric field. In other words, due to the vertical electric field, the speed at which the liquid crystal molecules 20a align themselves along the z direction from being inclined in the xy plane can be improved.

According to the present embodiment, black display is performed by using vertical orientation of the liquid crystal molecules 20a. In other words, unlike the driving method in Japanese Patent Application Laid-Open Publication No. 2004-354407, in the present embodiment, a black display is not performed both by horizontally orienting and vertically orienting the liquid crystal molecules 20a. Therefore, compensation for the black display can be performed and a high contrast can be obtained.

Method of Driving

Embodiment 1

Figure 6:
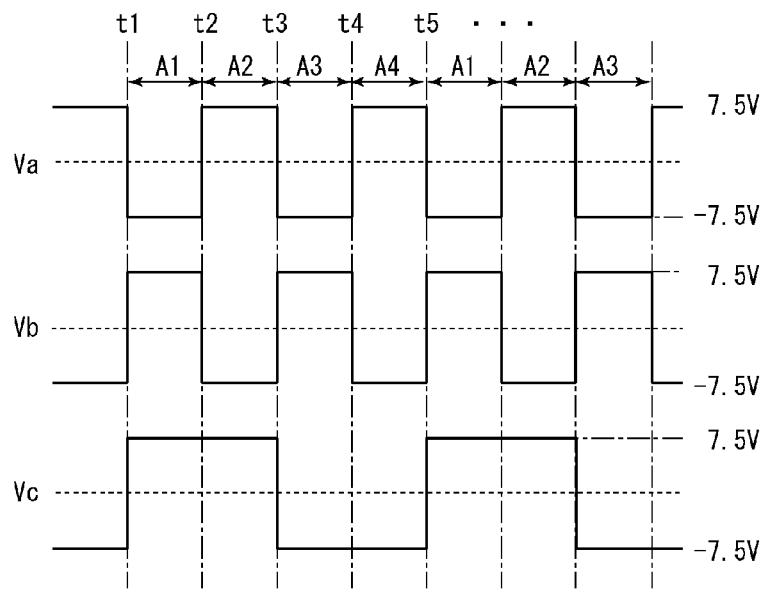
FIG. 6 is a graph showing the change in potential of a pair of electrodes and an opposite electrode through time in a driving method according to Embodiment 1 of the present invention.

Next, the driving method of the liquid crystal display device 1 will be explained. FIG. 6 is a graph showing the change in potential Va of the electrode 144A, the change in potential Vb of the electrode 144B, and the change in potential Vc of the opposite electrode 32 through time in the driving method related to Embodiment 1 of the present invention. The vertical axis in FIG. 6 indicates the potential of each electrode and the horizontal axis indicates time.

As shown in FIG. 6, the potential Va of the electrode 144a and the potential Vb of the electrode 144B reverse at prescribed cycles. The length of the period up to when the potentials Va and Vb reverse is the same, and the timing at which the potentials reverse is also the same. The potentials Va and Vb always have the opposite polarity to each other.

The potential Vc of the opposite electrode 32 reverses polarity at a cycle that is twice as long as the cycle of the potentials Vc and Vb (½ in frequency). The timings at which the potential Vc reverses polarity are the same as some timings at which the potentials Va and Vb reverse polarity. In other words, after the potential Vc reverses polarity at the same time as when the polarity of the potentials Va and Vb reverse, then the next time when the polarities Va and Vb do not reverse polarity, the polarity of the potential Vc does not reverse. Then, the potential Vc reverses polarity again when the potentials Va and Vb reverse polarity.

In other words, this operation can be explained as follows. First, at a time t1, a driving operation (first driving operation) in which the potential Va of the electrode 144A is made negative, the potential Vb of the electrode 144B is made positive, and the potential Vc of the opposite electrode 32 is made positive takes place. At a time t2, a driving operation (second driving operation) in which the potential Va is made positive, the potential Vb is made negative, and the potential Vc is made positive takes place. At a time t3, a driving operation (third driving operation) in which the potential Va is made negative, the potential Vb is made positive, and potential Vc is made negative takes place. At a time t4, a driving operation (fourth driving operation) in which the potential Va is made positive, the potential Vb is made negative, and the potential Vc is made negative takes place.

The polarity of the potential Vc does not reverse at the time t2 and stays the same (positive). In the present specification, this type of operation is also referred to as the "driving operation in which the potential Vc is made positive." Similarly, the polarity of the potential Vc does not reverse at time t4 and stays the same (negative). This type of operation is referred to as the "driving operation in which the potential Vc is made negative."

At time t5 of the present embodiment, the first driving operation is executed again. Then, the first to fourth driving operations are repeated.

The first to fourth driving operations are executed at prescribed intervals. As a result, the length of the period A1 between the times t1 and t2, the length of the period A2 between the times t2 and t3, the length of the period A3 between the times t3 and t4, and the length of the period A4 between the times t4 and t5 are the same.

The effect of the present embodiment is described with reference to FIGS. 7A to 7D.

FIGS. 7A to 7D are cross-sectional views along the line A-A of FIG. 2. In FIGS. 7A to 7D, a portion of the hatching pattern is omitted for ease of viewing. FIGS. 7A to 7D schematically show the direction and size of the electric field formed by the electrodes 144A and 144B, the opposite electrode 32, and the common electrode 12. The solid line arrow shows that the electric field is formed with a 15V difference in potential and the dotted line arrow shows that the electric field is formed with a 7.5V difference in potential. The direction of the arrow indicates the direction of the electric field, and is shown such that the direction of the electric field is from high potential to low potential. The same can be said for FIGS. 9A, 9B, 13A to 13D, and 19A to 19D mentioned later.

Figure 7A:
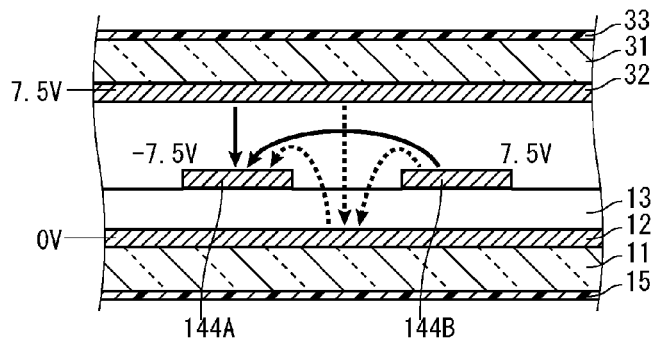
FIG. 7A is a cross-sectional view schematically showing an electric field formed in the liquid crystal layer during a period A1 of FIG. 6.

FIG. 7A is a cross-sectional view schematically showing the electric field formed in the liquid crystal layer 20 during the period A1 of FIG. 6. In the period A2, the potential Va of the electrode 144A is −7.5V, the potential Vb of the electrode 144B is 7.5V, the potential Vc of the opposite electrode 32 is 7.5V, and the potential of the common electrode 12 is 0V. As a result, the electric field is formed from the electrode 144B to the electrode 144A. In addition, the electric field is formed from the opposite electrode 32 to the electrode 144A. Furthermore, electric fields are formed respectively from the opposite electrode 32 to the common electrode 12, from the electrode 144B to the common electrode 12, and from the common electrode 12 to the electrode 144A.

Figure 7B:
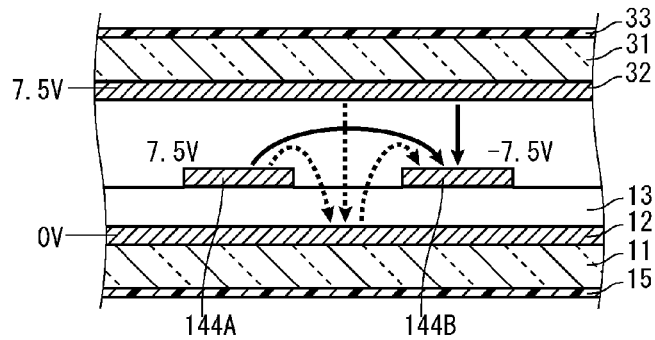
FIG. 7B is a cross-sectional view schematically showing the electric field formed in the liquid crystal layer during a period A2 of FIG. 6.

FIG. 7B is a cross-sectional view schematically showing the electric field formed in the liquid crystal layer 20 during the period A2 of FIG. 6. In the period A2, the potential Va of the electrode 144A is 7.5V, the potential Vb of the electrode 144B is −7.5V, the potential Vc of the opposite electrode 32 is 7.5V, and the potential of the common electrode 12 is 0V. As a result, an electric field is formed from the electrode 144A to the electrode 144B. In addition, an electric field is formed from the opposite electrode 32 to the electrode 144b. Furthermore, electric fields respectively from the opposite electrode 32 to the common electrode 12, from the electrode 144A to the common electrode 12, and from the common electrode 12 to the electrode 144B.

Figure 7C:
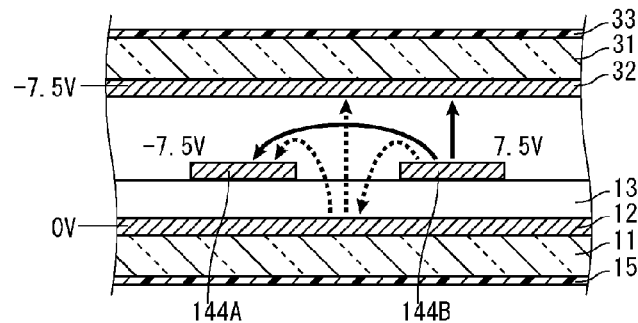
FIG. 7C is a cross-sectional view schematically showing the electric field formed in the liquid crystal layer during a period A3 of FIG. 6.

FIG. 7C is a cross-sectional view schematically showing the electric field formed in the liquid crystal layer 20 during the period A3 of FIG. 6. In the period A3, the potential Va of the electrode 144A is −7.5V, the potential Vb of the electrode 144B is 7.5V, the potential Vc of the opposite electrode 32 is −7.5V, and the potential of the common electrode 12 is 0V. As a result, the electric field is formed from the electrode 144B to the electrode 144A. In addition, an electric field is formed from the electrode 144B to the opposite electrode 32. Furthermore, electric fields are formed respectively from the common electrode 12 to the opposite electrode 32, from the electrode 144B to the common electrode 12, and from the common electrode 12 to the electrode 144A.

Figure 7D:
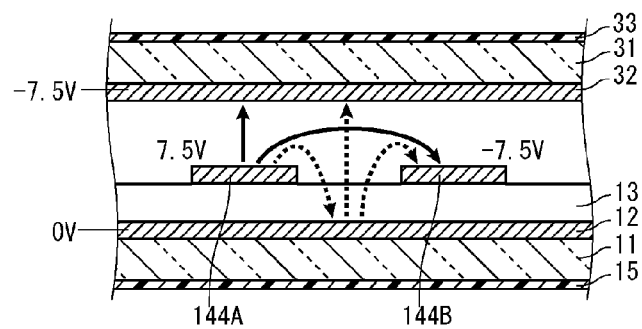
FIG. 7D is a cross-sectional view schematically showing the electric field formed in the liquid crystal layer during a period A4 of FIG. 6.

FIG. 7D is a cross-sectional view schematically showing the electric field formed in the liquid crystal layer 20 during the period A4 of FIG. 6.

In the period A4, the potential Va of the electrode 144A is 7.5V, the potential Vb of the electrode 144B is −7.5V, the potential Vc of the opposite electrode 32 is −7.5V, and the potential of the common electrode 12 is 0V. As a result, the electric field is formed from the electrode 144A to the electrode 144B. In addition, an electric field is formed from the electrode 144A to the opposite electrode 32. Furthermore, electric fields are formed respectively from the common electrode 12 to the opposite electrode 32, from the electrode 144A to the common electrode 12, and from the common electrode 12 to the electrode 144B.

FIG. 7A shows that in period A1, an electric field is formed between the electrode 144A and the opposite electrode 32, but there is no electric field formed between the electrode 144B and the opposite electrode 32. As a result, electric field deviation takes place in one pixel Px. The same could be said for the period A4. On the other hand, by contrast to the periods A2 and A1, FIG. 7B shows that an electric field is formed between the electrode 144B and the opposite electrode 32, but not formed between the electrode 144A and the opposite electrode 32. The same could be said for the period A3.

In the present embodiment, the electric field deviation can be canceled out by executing the first to fourth driving operations. In other words, by going through periods A1 to A4, the electric field can be prevented from concentrating between one of the electrodes 144A and 144B and the opposite electrode 32.

In the present embodiment, it can be seen from comparing FIG. 7A to FIG. 7D that the directions of the electric fields are reversed from each other in periods A1 and A4. In the present embodiment, it can be seen from comparing FIG. 7B to FIG. 7C that the directions of the electric fields are reversed from each other in periods A2 and A3. As a result, electric charge deviation of the liquid crystal layer 20 can be prevented.

In the present embodiment, the polarities of the potentials Va and Vb are reversed at twice the frequency at which the polarity of the potential Vc is reversed. By increasing the frequency at which the electric field reverses, flickering becomes harder to perceive.

Comparison Example

Figure 8:
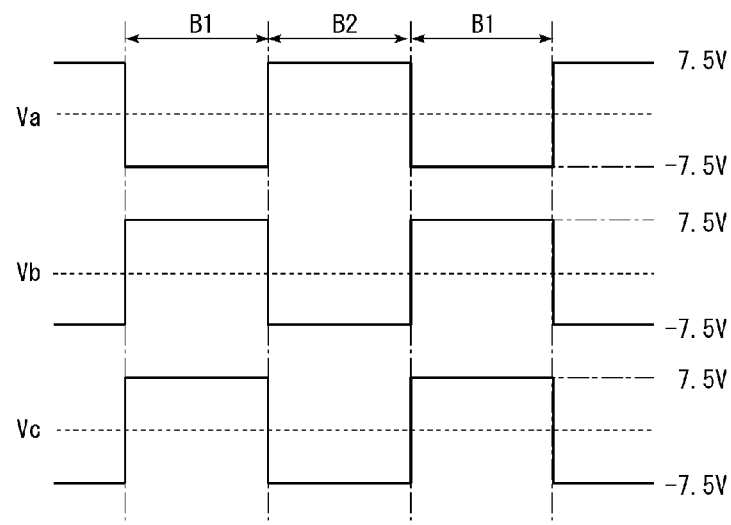
FIG. 8 is a graph showing the change in potential in a pair of electrodes and an opposite electrode through time in a driving method of a comparison example.

Next, in order to explain the effects of the present embodiment, a description of a hypothetical example will be provided. FIG. 8 shows a graph of the changes in the potential Va of the electrode 144a, the potential Vb of the electrode 144B, and the potential Vc of the opposite electrode 32 caused by the driving method of a comparison example. The vertical axis of FIG. 8 indicates the potential of each electrode, and the horizontal axis indicates time.

In the comparison example, the potentials Va, Vb, and Vc reverse at a prescribed cycle. In the comparison example, the length of the cycles up to when the potentials Va, Vb, and Vc reverse is the same, and the timing at which the polarities reverse is also the same. The potentials Va and Vb and the potentials Va and Vc always have opposite polarities, and the potentials Vb and Vc always have the same polarity.

As shown in FIG. 8, according to the driving method of the comparison example, the periods B1 and B2 are repeated alternately.

Figure 9A:
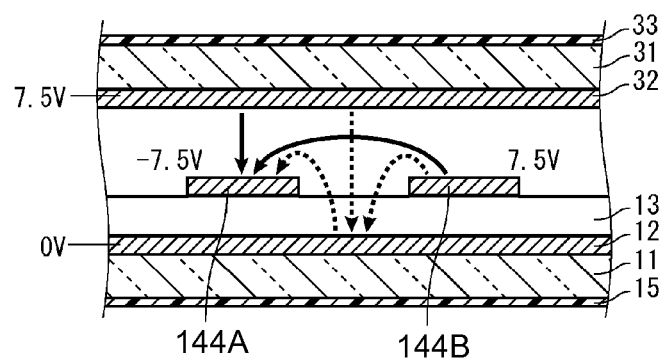
FIG. 9A is a cross-sectional view schematically showing the electric field formed in the liquid crystal layer during a period B1 of FIG. 8.

FIG. 9A is a cross-sectional view schematically showing the electric field formed in the liquid crystal layer 20 during the period B1 of FIG. 8. In the period B1, the potential Va of the electrode 144A is −7.5V, the potential Vb of the electrode 144B is 7.5V, the potential Vc of the opposite electrode 32 is 7.5V, and the potential of the common electrode 12 is 0V.

Figure 9B:
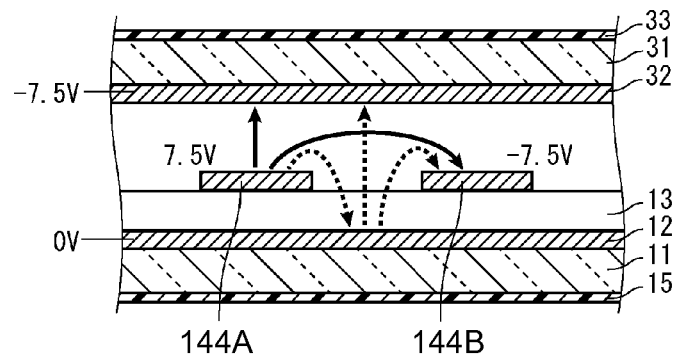
FIG. 9B is a cross-sectional view schematically showing the electric field formed in the liquid crystal layer during a period B2 of FIG. 8.

FIG. 9B is a cross-sectional view schematically showing the electric field formed in the liquid crystal layer 20 during the period B2 of FIG. 8. In the period B2, the potential Va of the electrode 144A is −7.5V, the potential Vb of the electrode 144B is 7.5V, the potential Vc of the opposite electrode 32 is −7.5V, and the potential of the common electrode 12 is 0V.

As can be seen from FIGS. 9A and 9B, the directions of the electric fields are reversed from each other in periods B1 and B2. Therefore, the driving method of the comparison example can also prevent the electric charge deviation in the liquid crystal layer 20.

On the other hand, with the driving method of the comparison example, in both periods B1 and B2, an electric field is formed between the electrode 144A and the opposite electrode 32, and an electric field is not formed between the electrode 144B and the opposite electrode 32. Thus, even if the periods B1 and B2 are repeated, the electric field deviation is not canceled out.

If electric field deviation occurs, the alignment of the liquid crystal molecules changes depending on the location, and thus, uneven brightness can occur within the pixel Px. Furthermore, because impurity ions can accumulate with ease where the electric fields concentrate, the comparison example is susceptible to burn-in.

According to the driving method of the present embodiment, unlike the comparison example, the electric field deviation within the pixel Px can be prevented.

The driving method related to Embodiment 1 of the present invention has been explained through the comparison example. In the present embodiment, an example of an embodiment was provided in which the central voltage (bias voltage) is 0V, and the potentials Va, Vb, and Vc were changed. However, the same bias voltage may be applied to the electrodes 144A and 144B, the opposite electrode 32, and the common electrode 12. For example, if a bias voltage of 7.5V is applied to all of the electrodes, then the potentials Va, Vb, and Vc change between 0V and 15V. Even in this case, the same effects as the present embodiment can be attained. Furthermore, in the present embodiment, the amplitudes of all of the potentials Va, Vb, and Vc were described as 15V, but the amplitudes of the potentials Va, Vb, and Vc can be changed as appropriate.

The electrodes 144A and 144B are respectively connected to the TFTs 143A and 143B. Thus, due to the change in the gate voltage caused by turning ON and OFF the TFTs 143A and 143B, the potentials of the electrodes 144A and 144B change. Specifically, the potentials of the electrodes 144A and 144B change by approximately $\Delta V = (Vgh - Vgl) \cdot Cgd / Cpix$. Here, Vgh is the gate voltage when the TFT 143A (143B) is ON, and Vgl is the gate voltage when the TFT 143A (143B) is OFF. Furthermore, Cgd is the capacitance between the gate and the drain of the TFT 143A (143B), and Cpix is the load capacitance of the electrodes 144A and 144B. It is preferable that the electrodes 144A and 144B be applied a voltage taking the potential change ΔV into account.

In the present embodiment, it is preferable that the potentials Va and Vb be symmetrical to each other with the common electrode 12 as the center. In other words, it is preferable that the absolute value of the difference in potential between the electrode 144A and the common electrode 12 and the absolute value of the difference in potential between the electrode 144B and the common electrode 12 be equal. As a result, the electric fields can be made symmetrical. In this case, it is preferable that the absolute value of the difference in potential between the electrode 144A and the common electrode 12 and the absolute value of the difference in potential between the electrode 144B and the common electrode 12 be equal for the effective potential including the potential change ΔV.

As in the present embodiment, it is preferable that the absolute value of the difference in potential between the opposite electrode 32 and the common electrode 12 be constant. As a result, the intensity of the vertical electric field formed between the opposite electrode 32 and the common electrode 12 becomes constant. Therefore, flickering can be suppressed from occurring.

Driving Using Modules

Below, a more specific description of the configuration for executing the driving method related to Embodiment 1 of the present invention is provided.

Figure 10:
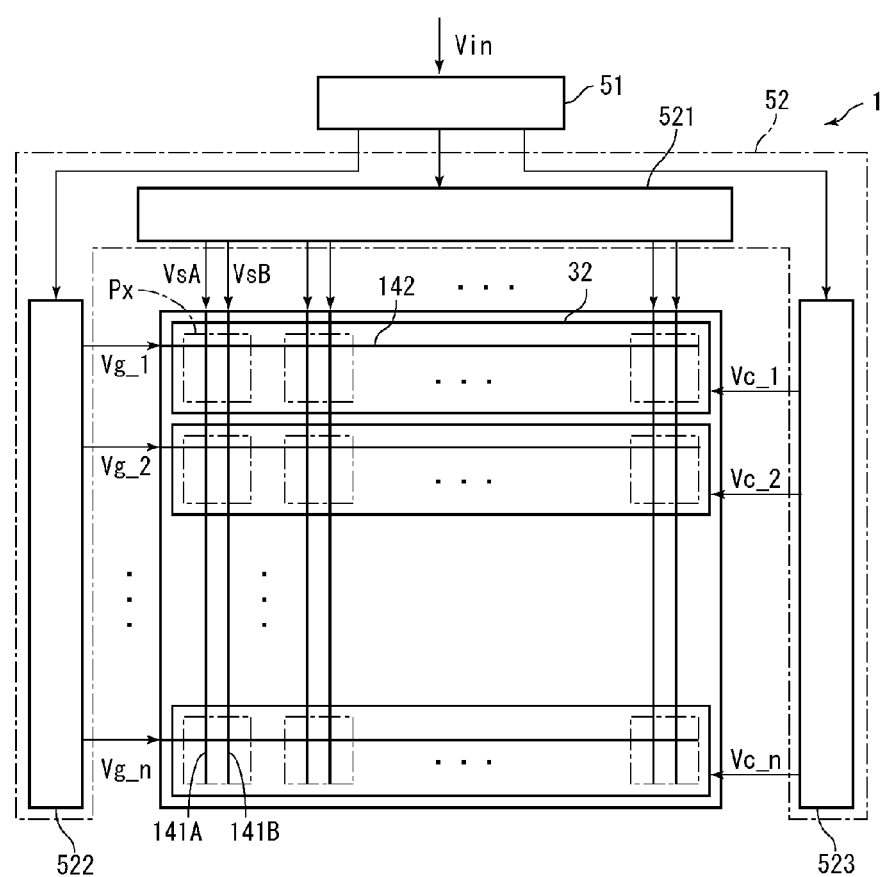
FIG. 10 is a block diagram showing the functional configuration of the liquid crystal display device.

FIG. 10 is a block diagram showing the functional configuration of the liquid crystal display device 1. The liquid crystal display device 1 further includes a control unit 51 and a driving unit 52. The driving unit 52 includes a source driver 521, a gate driver 522, and an opposite electrode row driver 523.

The control unit 51 and the driving unit 52 are mounted on the array substrate 10 or the opposite substrate 30 by TAB (tape automated bonding) technology or COG (chip on glass) technology. A portion or the entirety of the control unit 51 and the driving unit 52 may be disposed in an area outside of the array substrate 10 and the opposite substrate 30.

The control unit 51 performs a prescribed process on an image signal Vin supplied from outside, and then supplies the image signal Vin to the source driver 521, the gate driver 522, and the opposite electrode row driver 523.

The source driver 521 generates signals VsA and VsB based on the signal supplied from the control unit 51. Then, the source driver 521 supplies the signal VsA to the source line 141A and supplies the signal VsB to the source line 141B.

The gate driver 522 generates the signal Vg based on the signal supplied by the control portion 51, and supplies the signal Vg to the gate line 142. Here, the number of gate lines 142 is n (n being a natural number), and the signal Vg of the mth row (1≤m≤n) supplied to the gate line 142 is the signal Vg_m.

The opposite electrode row driver 523 generates the signal Vc based on the signal supplied from the control unit 51, and supplies this signal to the opposite electrode 32. In a similar manner to the signal Vg, the signal Vc supplied to the mth row of the opposite electrode 32 is the signal Vc_m.

Figure 11:
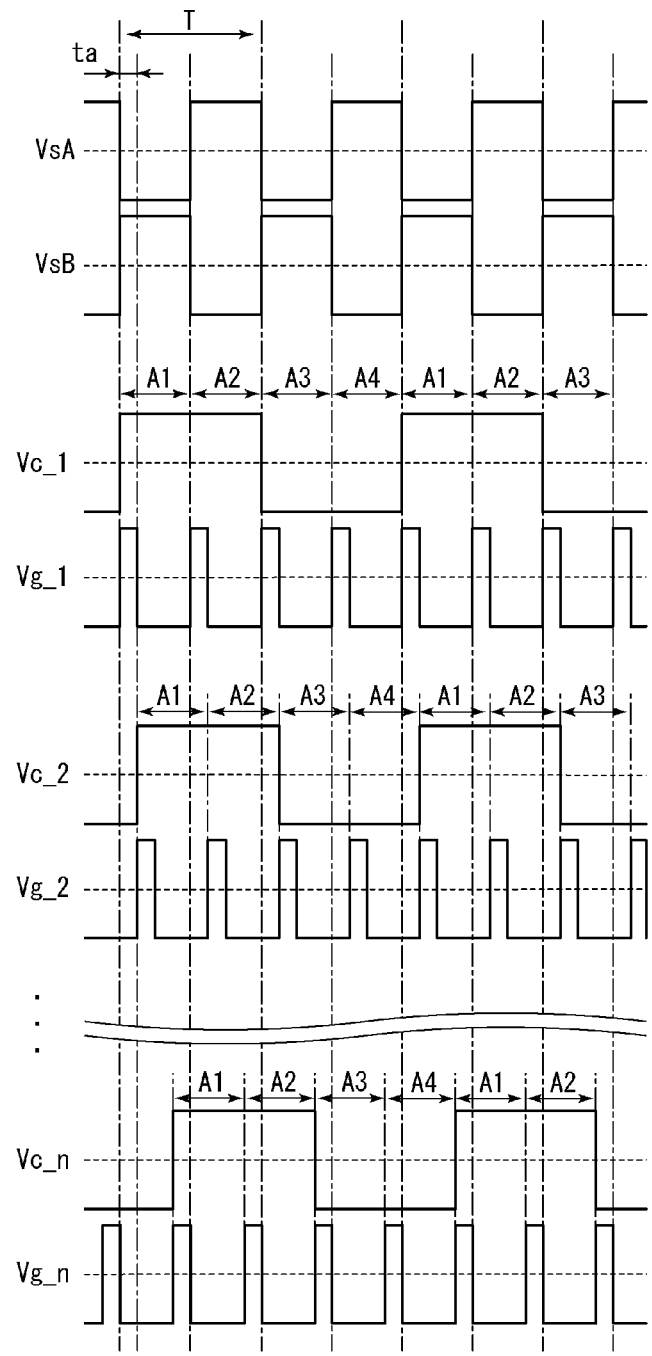
FIG. 11 is a timing chart of the respective signals for the driving method of Embodiment 1 of the present invention.

FIG. 11 is a timing chart of each signal for the driving method of Embodiment 1 of the present invention.

The signals VsA and VsB reverse polarity at a prescribed cycle. The length of the cycle up to when the polarities of the signals VsA and VsB reverse is the same, and the timing at which the polarities reverse is also the same. More specifically, the signals VsA and VsB reverse polarities at a cycle of half the length of one frame period T. The signals VsA and VsB always have opposite polarities. In addition, at any time, the absolute value of the signal VsA and the absolute value of the signal VsB are equal.

The signals Vg1 to Vg_n become high one at a time. In other words, during a particular period ta, the signal Vg_1 becomes high, and the signals Vg_2 to Vg_n becomes low. Then, when the signal Vg_1 becomes low, the signal Vg_2 becomes high. When the signal Vg_2 is high, the signals Vg_1 and Vg_3 to Vg_n becomes low. In this manner, the signals Vg1 to Vg_n become high one at a time, and other signals become low.

In the present embodiment, each of the signals Vg1 to Vg_n becomes high once during half of one frame period T. In other words, in the present embodiment, double speed driving in which the gate line 142 is scanned twice during one frame period T is performed.

The operation at this time will be described with reference to FIG. 4. When the signal Vg_m becomes high, the TFTs 143A and 143B, which are connected to the gate line 142 of the mth row, turn ON. As a result, the signal VsA is supplied from the source line 141A to the electrode 144A, and the signal VsB is supplied from the source line 141B to the electrode 144B. The potentials of the electrodes 144A and 144B are maintained at a substantially constant level even after the signal Vg_m becomes low and the TFTs 143A and 143B turn OFF due to the liquid crystal capacitances Clc1 and Clc2, and the storage capacitance Cs.

Supplying of the signals VsA and VsB to each column can take place one at a time (dot-sequential driving) or take place all at once (line-sequential driving).

More descriptions will be provided based on FIG. 11. The signal Vc_m that is supplied to the opposite electrode 32 of the mth row reverses potential at the same time as when the signal Vg_m becomes high level. However, the length of the cycle up to when the polarity of the signal Vc_m reverses is twice the length in which the signal Vg_m becomes high level. In other words, when the polarity of the signal Vc_m reverses when the signal Vg_m becomes high level, then the next time the signal Vg_m becomes high, the polarity of the signal Vc_m does not reverse. Then, the signal Vc_m reverses polarity again when the signal Vg_m becomes high. The length of the cycle up to when the signal Vc_m reverses is the same as the length of one frame period T.

By supplying the signals VsA, VsB, Vg_1 to Vg_n, and Vc_1 to Vc_n, the driving method related to Embodiment 1 of the present invention is performed. In other words, the period A1 described in FIG. 7A is the time from when the signal Vg_m of the pixel Px at the mth row first becomes high to when the signal Vg_m becomes high for the second time. The period A2 described in FIG. 7B is the time between when the signal Vg_m becomes high for the second time and when it becomes high for the third time. The period A3 described in FIG. 7C is the time between when the signal Vg_m becomes high for the third time and when it becomes high for the fourth time. The period A4 described in FIG. 7D is the time between when the signal Vg_m becomes high for the fourth time and when it becomes high for the fifth time.

A specific configuration to execute the driving method according to Embodiment 1 of the present invention was described. In the present embodiment, a case in which the gate line 142 is scanned twice in one frame period T was described. As a result, the first driving operation and the second driving operation are executed in the first frame, and the third driving operation and the fourth driving operation are executed in the second frame. In other words, in the present embodiment, the first to fourth driving operations are executed during two frame periods. However, the gate line 142 may be scanned once per frame period T. In this case, the first to fourth driving operations are executed during four frame periods. In addition, the gate line 142 may be scanned four times per frame period T. In this case, the first to fourth driving operations are executed in one frame period.

It is preferable that the potential of the common electrode 12 of the present embodiment be constant. In the present embodiment, the potential of the common electrode 12 is kept constant, and a vertical electric field is formed by changing the potential of the opposite electrode 32. In other words, the common electrode 12 always has the same potential across the entire display region. As a result, the common electrode 12 neither needs to be formed for each row of pixels Px like the opposite electrode 32 nor needs to be driven in a line-sequential manner.

Embodiment 2

Figure 12:
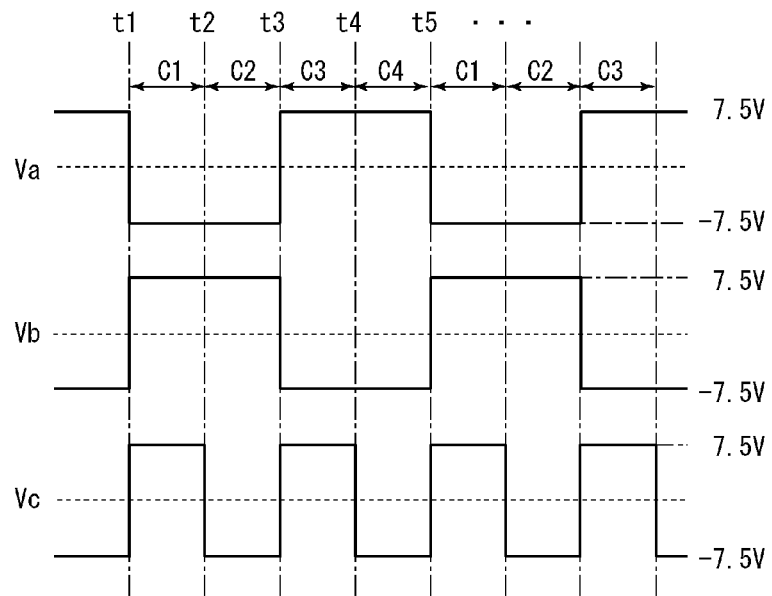
FIG. 12 is a graph showing the change in potential of a pair of electrodes and an opposite electrode through time in a driving method according to Embodiment 2 of the present invention.

FIG. 12 is a driving method according to Embodiment 2 of the present invention, and is a graph showing the potential Va of the electrode 144A, the potential Vb of the electrode 144B, and the potential Vc of the opposite electrode 32. The vertical axis of FIG. 12 indicates the potential of each electrode, and the horizontal axis indicates time.

In the present embodiment, the potential Va of the electrode 144A and the potential Vb of the electrode 144B reverse polarity in a prescribed cycle. The cycle up to when the potentials Va and Vb reverse is the same, and the timing at which the potentials reverse is also the same. The potentials Va and Vb always have opposite polarities.

Unlike Embodiment 1, in the present embodiment, the polarity of the potential Vc of the opposite electrode 32 reverses in half the time that the potentials Va and Vb reverse (twice the frequency). Some of the times at which the potential Vc reverses polarity are the same the times at which the potentials Va and Vb reverse polarity. In other words, the potential Vc reverses polarity at the same time as when the polarities of the potentials Va and Vb reverse, but reverses polarity an additional time during this cycle.

In other words, this operation can be explained as follows. First, at a time t1, a driving operation (equivalent of first driving operation in Embodiment 1) in which the potential Va of the electrode 144A is made negative, the potential Vb of the electrode 144B is made positive, and the potential Vc of the opposite electrode 32 is made positive takes place. At a time t2, a driving operation (corresponding to the third driving operation in Embodiment 1) in which the potential Va is made negative, the potential Vb is made positive, and the potential Vc is made negative takes place. At a time t3, a driving operation (corresponding to the second driving operation of Embodiment 1) in which the potential Va is made positive, the potential Vb is made negative, and the potential Vc is made positive takes place. At a time t4, a driving operation (corresponding to the second driving operation of Embodiment 1) in which the potential Va is made positive, the potential Vb is made negative, and the potential Vc is made positive takes place.

In the present embodiment as well, at a time t5, the first driving operation is executed again. Then, the first driving operation, the third driving operation, the second driving operation, and the fourth driving operation are executed repeatedly.

In the present embodiment as well, the first driving operation, the third driving operation, the second driving operation, and the fourth driving operation are executed at a prescribed interval. As a result, the length of the period C1 between the times t1 and t2, the length of the period C2 between the times t2 and t3, the length of the period C3 between the times t3 and t4, and the length of the period C4 between the times t4 and t5 are the same.

Figure 13A:
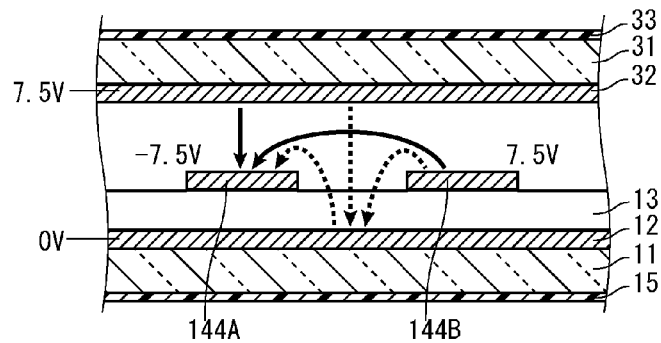
FIG. 13A is a cross-sectional view schematically showing an electric field formed in the liquid crystal layer during a period C1 of FIG. 12.

FIG. 13A is a cross-sectional view schematically showing an electric field formed in the liquid crystal layer 20 during the period C1 in FIG. 12. In the period C1, the potential Va of the electrode 144A is −7.5V, the potential Vb of the electrode 144B is 7.5V, the potential Vc of the opposite electrode 32 is 7.5V, and the potential of the common electrode 12 is 0V. As a result, the electric field is formed from the electrode 144B to the electrode 144A. In addition, the electric field is formed from the opposite electrode 32 to the electrode 144A. Furthermore, electric fields are formed respectively from the opposite electrode 32 to the common electrode 12, from the electrode 144B to the common electrode 12, and from the common electrode 12 to the electrode 144A.

Figure 13B:
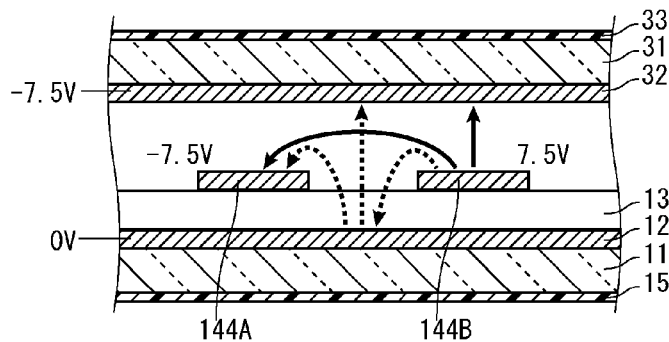
FIG. 13B is a cross-sectional view schematically showing an electric field formed in the liquid crystal layer during a period C2 of FIG. 12.

FIG. 13B is a cross-sectional view schematically showing an electric field formed in the liquid crystal layer 20 during the period C2 in FIG. 12. In the period C2, the potential Va of the electrode 144A is −7.5V, the potential Vb of the electrode 144B is 7.5V, the potential Vc of the opposite electrode 32 is −7.5V, and the potential of the common electrode 12 is 0V. As a result, the electric field is formed from the electrode 144B to the electrode 144A. In addition, an electric field is formed from the electrode 144B to the opposite electrode 32. Furthermore, electric fields are formed respectively from the common electrode 12 to the opposite electrode 32, from the electrode 144B to the common electrode 12, and from the common electrode 12 to the electrode 144A.

Figure 13C:
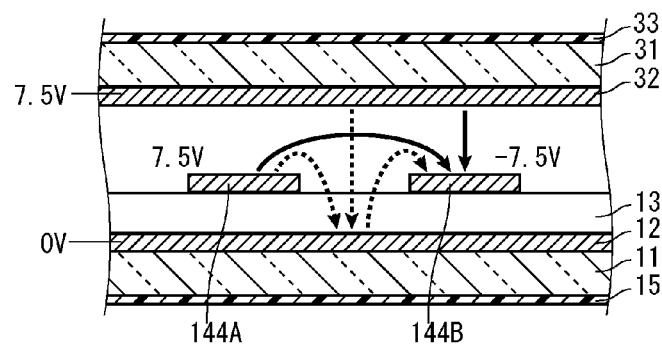
FIG. 13C is a cross-sectional view schematically showing an electric field formed in the liquid crystal layer during a period C3 of FIG. 12.

FIG. 13C is a cross-sectional view schematically showing an electric field formed in the liquid crystal layer 20 during the period C3 in FIG. 12. In the period C3, the potential Va of the electrode 144A is 7.5V, the potential Vb of the electrode 144B is −7.5V, the potential Vc of the opposite electrode 32 is 7.5V, and the potential of the common electrode 12 is 0V. As a result, the electric field is formed from the electrode 144A to the electrode 144B. In addition, an electric field is formed from the opposite electrode 32 to the electrode 144b. Furthermore, electric fields are formed respectively from the opposite electrode 32 to the common electrode 12, from the electrode 144A to the common electrode 12, and from the common electrode 12 to the electrode 144B.

Figure 13D:
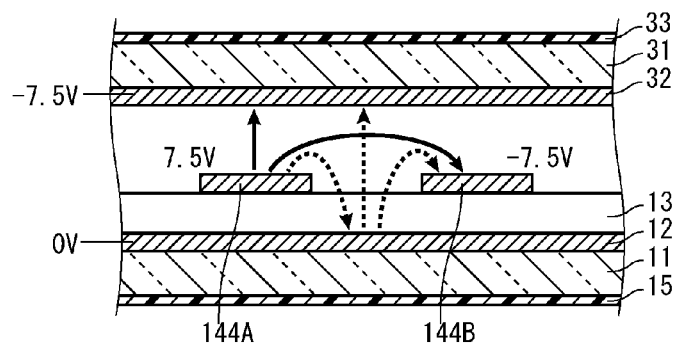
FIG. 13D is a cross-sectional view schematically showing an electric field formed in the liquid crystal layer during a period C4 of FIG. 12.

FIG. 13D is a cross-sectional view schematically showing an electric field formed in the liquid crystal layer 20 during the period C4 in FIG. 12. In the period C4, the potential Va of the electrode 144A is 7.5V, the potential Vb of the electrode 144B is −7.5V, the potential Vc of the opposite electrode 32 is −7.5V, and the potential of the common electrode 12 is 0V. As a result, the electric field is formed from the electrode 144A to the electrode 144B. In addition, an electric field is formed from the electrode 144A to the opposite electrode 32. Furthermore, electric fields are formed respectively from the common electrode 12 to the opposite electrode 32, from the electrode 144A to the common electrode 12, and from the common electrode 12 to the electrode 144B.

In the present embodiment as well, the electric field deviation can be canceled out by executing the first driving operation, the third driving operation, the second driving operation, and the fourth driving operation. In other words, by going through the periods C1 to C4, the electric field can be prevented from concentrating between one of the electrodes 144A and 144B and the opposite electrode 32.

In the present embodiment as well, it can be seen from comparing FIG. 13A to FIG. 13D that the directions of the electric fields are reversed from each other in the periods C1 and C4. In a similar manner, it can be seen from comparing FIG. 13B to FIG. 13C that the directions of the electric fields are reversed from each other in periods C2 and C3. As a result, electric charge deviation of the liquid crystal layer 20 can be prevented.

In the present embodiment, the polarities of the potential Vc are reversed at twice the frequency at which the polarity of the potentials Va and Vb are reversed. By increasing the frequency, the flickering becomes harder to see.

Figure 14:
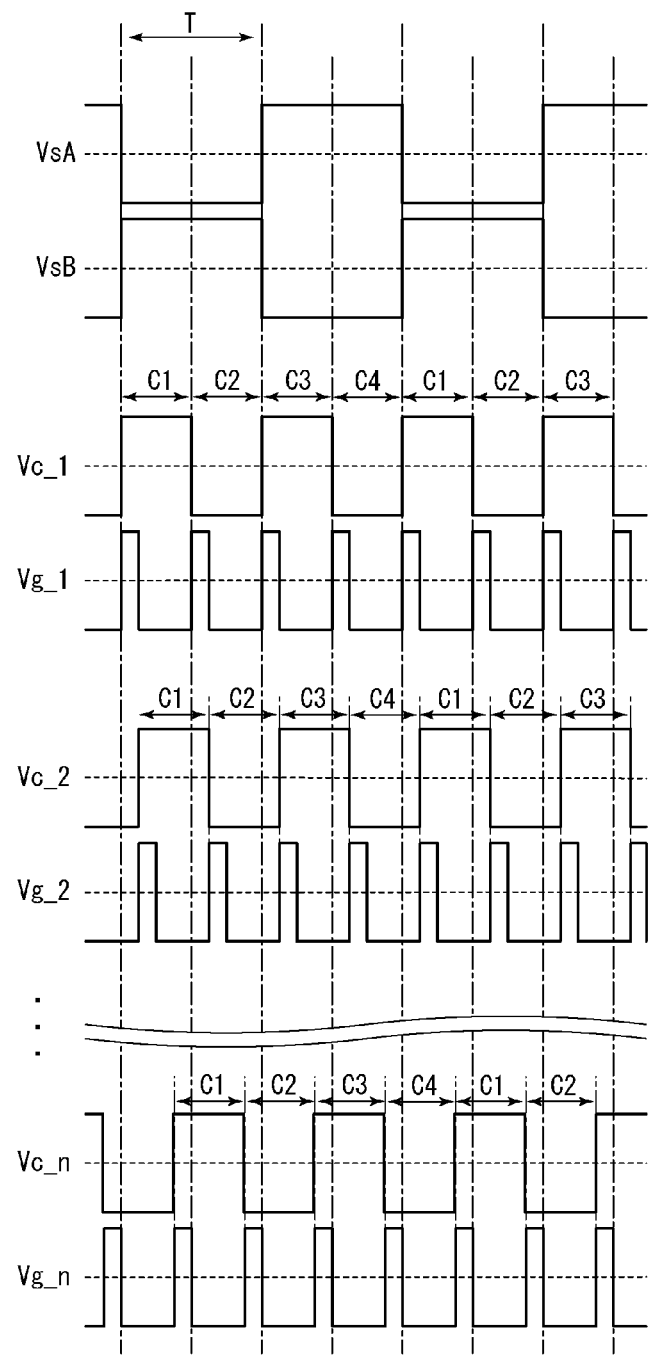
FIG. 14 is a timing chart of the respective signals for the driving method of Embodiment 2 of the present invention.

FIG. 14 is a timing chart of each signal to execute the driving method according to Embodiment 2 of the present invention.

Compared to Embodiment 1 (FIG. 11), the timing chart shown in FIG. 14 has a different cycle length up to when the polarity of the signals VSa, Vsb, and Vc_1 to Vc_n reverse. More specifically, the signals VsA and VsB reverse polarities at a cycle with the same length as one frame period T. Furthermore, the polarities of the signals Vc_1 to Vc_n reverse in half the time compared to one frame period T. In the present embodiment, the signal Vc_m supplied to the opposite electrode 32 of the mth row reverses polarity at the same time as when the signal Vg_m becomes high.

By supplying the signals VsA, VsB, Vg_1 to Vg_n, and Vc_1 to Vc_n, the driving method according to Embodiment 2 of the present invention is executed. In other words, the time from when the signal Vg_m of the pixel Px of the mth row first becomes high to when the signal Vg_m becomes high for the second time is the period C1 described in FIG. 13A. The time between when the signal Vg_m becomes high for the second time and when it becomes high for the third time is the period C2 described in FIG. 13B. The time between when the signal Vg_m becomes high for the second time and becomes high for the third time is the period C2 described in FIG. 13B. The time between when the signal Vg_m becomes high for the second time and becomes high for the third time is the period C2 described in FIG. 13B.

Modification Example 1 of Liquid Crystal Display Device Configuration

Figure 15:
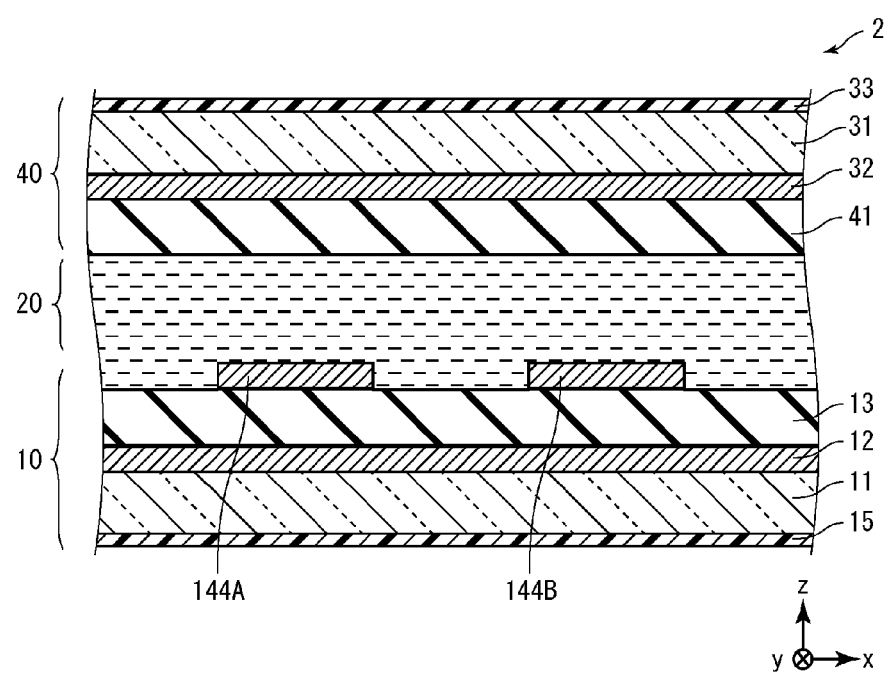
FIG. 15 is a schematic cross-sectional view of a liquid crystal display device according to a modification example of the present invention.
Figure 16:
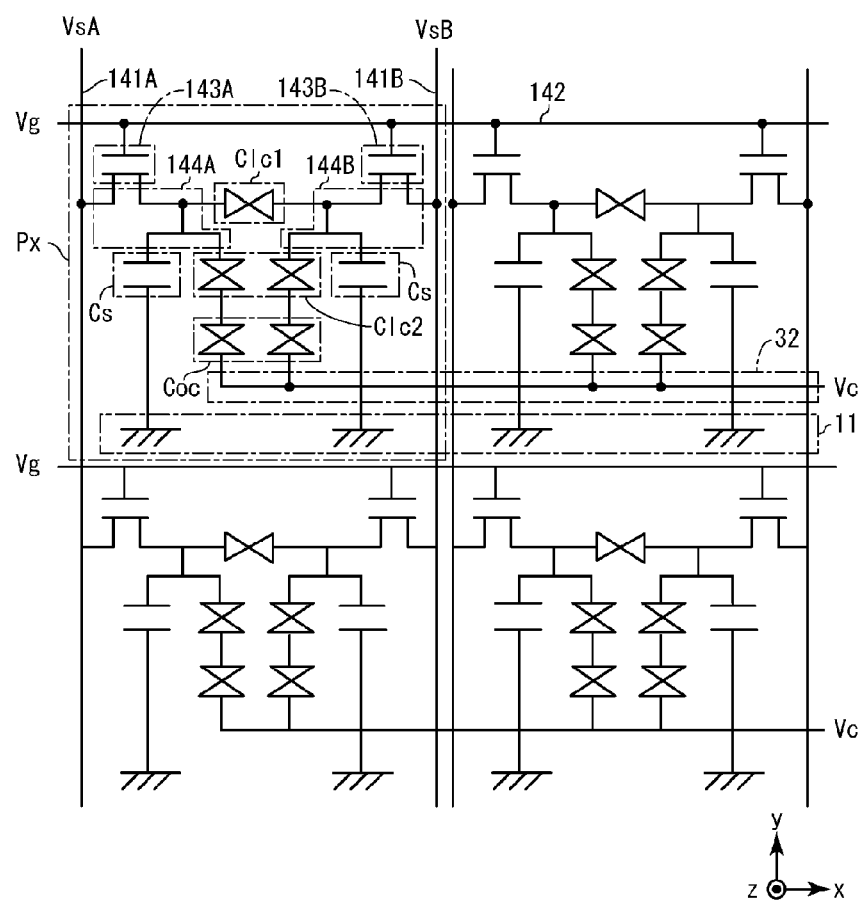
FIG. 16 is an equivalent circuit diagram of the liquid crystal display device according to the modification example of the present invention.

The driving method related to Embodiments 1 or 2 of the present invention can be suitably applied not only to the liquid crystal display device 1, but also to a liquid crystal display device 2 or 3. FIG. 15 is a schematic cross-sectional view of the liquid crystal display device 2 according to a modification example of the present invention. FIG. 16 is an equivalent circuit diagram of the liquid crystal display device 2.

Instead of the opposite substrate 30 of the liquid crystal display device 1, the liquid crystal display device 2 is provided with an opposite substrate 40. In addition to the structures included in the opposite substrate 30, the opposite substrate 40 further includes an overcoat layer 41.

The overcoat layer 41 is formed so as to cover the opposite electrode 32. The overcoat layer 41 has light-transmissive characteristics and insulating characteristics. The overcoat layer 41 is formed of a silicon nitride film, a silicon oxide film, or a silicon oxynitride film, and can be formed by CVD, for example. The overcoat layer 41 may be an organic material such as an acrylic resin, and if so, the overcoat layer 41 is formed by spin coating or slit coating.

As shown in FIG. 16, the electrode 144A and the opposite electrode 32, and the electrode 144B and the opposite electrode 32B are capacitively coupled through the liquid crystal capacitance Clc2 and a capacitance Coc of the overcoat layer 41.

According to the configuration of the liquid crystal display device 2, the strength of the vertical electric field becomes small due to the overcoat layer 41. As the strength of the vertical electric field becomes small, the effect of the horizontal electric field become relatively large, and the liquid crystal molecules become oriented with ease towards the x direction. As a result, the transmittance during white display can be improved.

It is preferable that the relative permittivity of the overcoat layer 41 be greater than 1. If the overcoat layer 41 is too thick, then the response speed of the liquid crystal molecules decrease. Thus, it is preferable that the thickness of the overcoat layer 41 be greater than 0 μm and less than 4 μm. It is preferable that the cell gap (thickness of the liquid crystal layer 20) be greater than 2 μm and less than 7 μm.

By executing the driving method in Embodiments 1 or 2 in the liquid crystal display device 2, the electric field within the pixel Px can be prevented from deviating.

Modification Example 2 of Liquid Crystal Display Device Configuration

Figure 17:
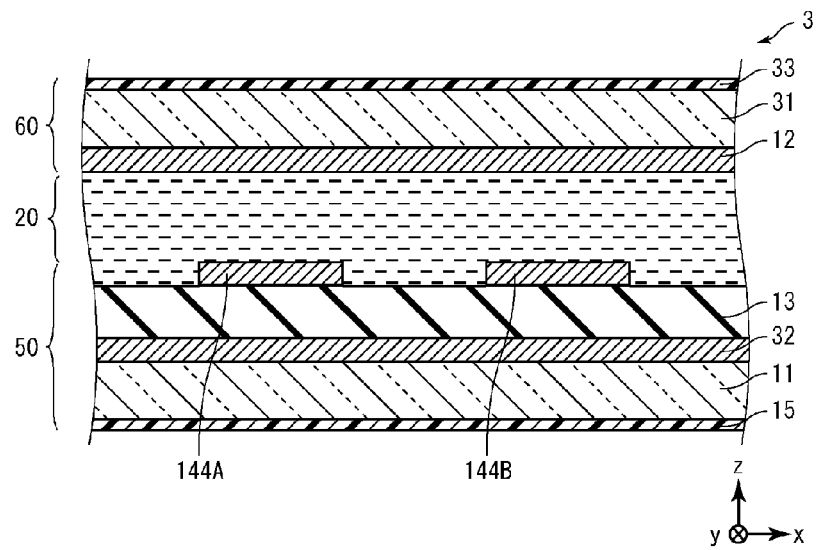
FIG. 17 is a schematic cross-sectional view of a liquid crystal display device according to another modification example of the present invention.
Figure 18:
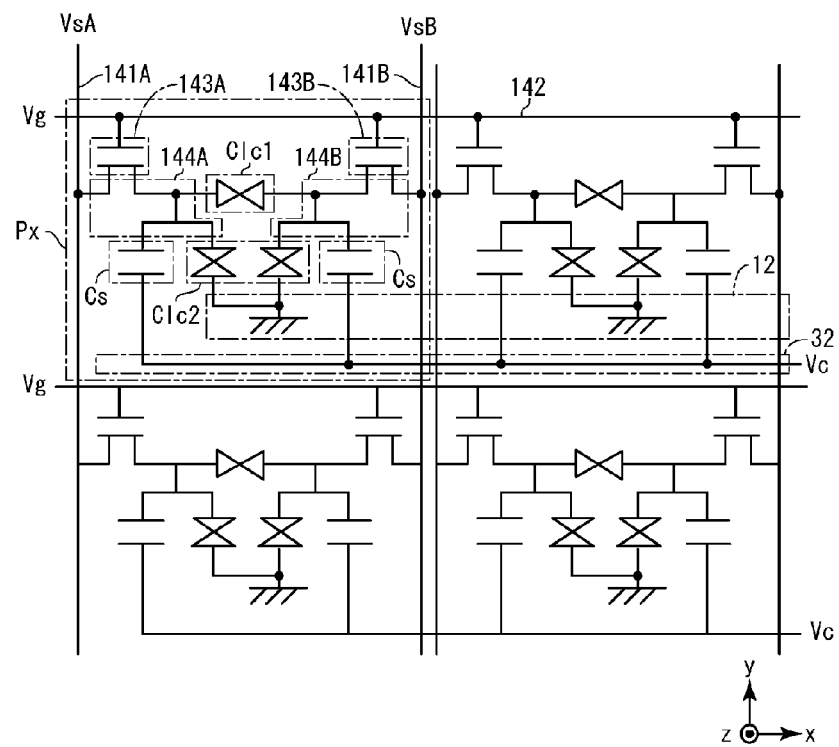
FIG. 18 is an equivalent circuit diagram of the liquid crystal display device according to the other modification example of the present invention.

FIG. 17 is a schematic cross-sectional view of the liquid crystal display device 3 according to a modification example of the present invention. FIG. 18 is an equivalent circuit diagram of the liquid crystal display device 3.

By contrast with the liquid crystal display device 1, the liquid crystal display device 3 has an array substrate 50 instead of an array substrate 10, and an opposite substrate 60 instead of the opposite substrate 30. In the liquid crystal display device 3, the common electrode 12 is formed on the opposite substrate 60, and the opposite electrode 32 is formed on the array substrate 50.

Figure 19A:
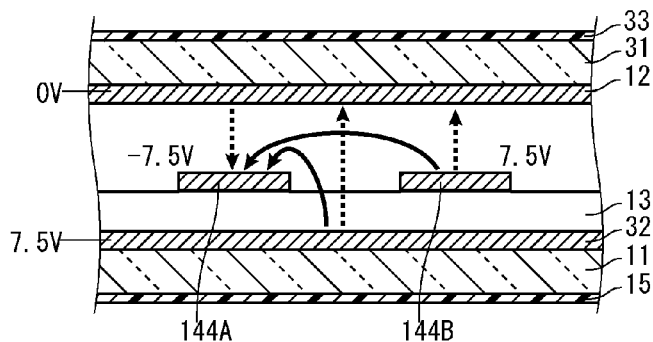
FIG. 19A is a cross-sectional view schematically showing an electric field formed in the liquid crystal layer during a period A1 of FIG. 6.
Figure 19B:
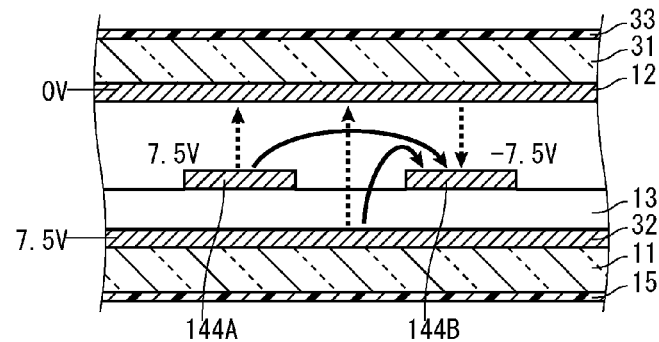
FIG. 19B is a cross-sectional view schematically showing an electric field formed in the liquid crystal layer during a period A2 of FIG. 6.
Figure 19C:
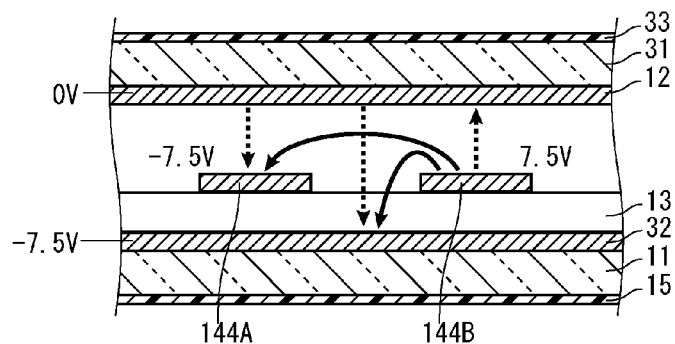
FIG. 19C is a cross-sectional view schematically showing an electric field formed in the liquid crystal layer during a period A3 of FIG. 6.
Figures 19D, 20:
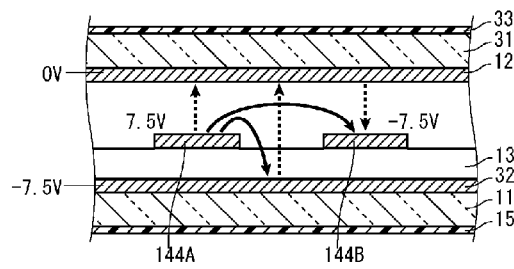
FIG. 19D is a cross-sectional view schematically showing an electric field formed in the liquid crystal layer during a period A4 of FIG. 6.
FIG. 20 is a table showing evaluation results of the driving method of Embodiment 1 and the comparison example of the present invention.

Below, the effect of a driving method (FIG. 6) according to Embodiment 1 of the present invention on the liquid crystal display device 3 is explained with reference to FIGS. 19A to 19D. FIG. 19A is a cross-sectional view schematically showing electric fields formed in the liquid crystal layer 20 during the period A1 in FIG. 6. FIG. 19B is a cross-sectional view schematically showing electric fields formed in the liquid crystal layer 20 during the period A2 in FIG. 6. FIG. 19C is a cross-sectional view schematically showing electric fields formed in the liquid crystal layer 20 during the period A3 in FIG. 6. FIG. 19D is a cross-sectional view schematically showing electric fields formed in the liquid crystal layer 20 during the period A4 in FIG. 6.

With reference to FIG. 19A, in the period A1, an electric field is formed between the electrode 144A and the opposite electrode 32, but an electric field is not formed between the electrode 144B and the opposite electrode 32. Therefore, there is an electric field deviation within one pixel Px. This similarly applies to the period A4. On the other hand, with reference to FIG. 19B, an electric field is formed between the electrode 144B and the opposite electrode 32, but an electric field is not formed between the electrode 144A and the opposite electrode 32, unlike in the periods A2 and A1. This similarly applies to period A3.

The electric field deviation can be canceled out by executing the first to fourth driving operations. In other words, by going through the periods A1 to A4, the electric field can be prevented from concentrating between one of the electrodes 144A and 144B and the opposite electrode 32. Furthermore, as can be seen by comparing FIG. 19A to FIG. 19D, the directions of the electric field in the periods A1 and A4 are reversed with respect to each other. In a similar manner, it can be seen from comparing FIG. 19B to FIG. 19C that the directions of the electric fields are reversed with respect to each other in periods A2 and A3. As a result, electric charge deviation in the liquid crystal layer 20 can be prevented.

The driving method in Embodiment 2 of the present invention (FIG. 12) may be applied to the liquid crystal display device 3. The liquid crystal display device 3 may have the overcoat layer 411 present in the liquid crystal display device 2 described above.

Other Embodiments

The embodiments of the present invention were described above, but the present invention is not limited to the embodiments above, and various modifications are possible within the scope of the present invention. Also, the respective embodiments can be appropriately combined.

Working Example

Below, detailed descriptions of the present invention will be provided based on a working example. The present invention is not limited to this working example.

In order to determine the effectiveness of the present invention, the driving method in Embodiment 1 of the present invention (driving method 1) and the driving method in Embodiment 2 (driving method 2) were executed, and the unevenness in brightness and burn-in during image display within a pixel Px were evaluated. The driving method of the comparison example (FIG. 8) was also evaluated. The driving methods 1 and 2 were evaluated for the liquid crystal display device 1 (no overcoat) and the liquid crystal display device 2 (with overcoat). The driving method for the comparison example was evaluated only for the liquid crystal display device 1 (no overcoat).

The results are shown in FIG. 20. The unevenness in luminance was evaluated by whether or not the difference between the maximum value and the minimum value of the luminance is less than or equal to 10% of the maximum value within one pixel Px. In the "uneven luminance" section of FIG. 20, ">10" is entered if the difference in brightness is greater than 10% of the maximum value, and "≤10" is entered if the difference in brightness is less than or equal to 10%.

The burn-in was evaluated by whether or not burn-in can be perceived through an ND filter after performing image display (including a gradation of 0 (black display) and a gradation of 255 (white display)) for 100 hours at room temperature and then performing display at a gradation of 32 (gray display). In the "burn-in" section of FIG. 20, "ND5" is entered if burn-in can be perceived at 5% ND transmittance, "ND10" is entered if burn-in can be perceived at 10% ND transmittance but not at 5% ND transmittance, and "–" is entered if burn-in cannot be perceived even with 10% ND transmittance.

As shown in FIG. 20, it was confirmed that the driving methods of the respective embodiments of the present invention can reduce uneven brightness and burn-in within the pixel Px compared to the driving method of the comparison example.

However, when there was an overcoat, the burn-in result was "ND10." The cause of this is thought to be impurity ions within the overcoat layer 41.

INDUSTRIAL APPLICABILITY

The present invention can be applied to the industry of liquid crystal display devices and the driving methods thereof.

DESCRIPTION OF REFERENCE CHARACTERS 1, 2, 3 liquid crystal display device
10, 50 array substrate
11 substrate
12 common electrode
13 insulating layer
14 array layer
141A, 141B source line
142 gate line
143A, 143B TFT
144A, 144B electrode
15 polarizing plate
20 liquid crystal layer
30, 40, 60 opposite substrate
31 substrate
32 opposite electrode
33 polarizing plate
41 overcoat layer

What is claimed is:

1. A liquid crystal display device having a plurality of pixels, comprising:
a first substrate;
a first electrode formed on the first substrate in each of the plurality of pixels;
a second electrode formed on the first substrate in each of the plurality of pixels;
a second substrate disposed so as to face the first substrate;
an opposite electrode formed on one of the first and second substrates, the opposite electrode being shared by at least some of the plurality of pixels;
a common electrode formed on another of the first and second substrates, the common electrode being shared by the plurality of pixels;
a liquid crystal layer sandwiched between the first and second substrates, the liquid crystal layer including liquid crystal molecules having a positive birefringence; and
a driving unit that controls the potential of the first electrode, the second electrode, and the opposite electrode,
wherein the driving unit executes driving operations during a unit period, said driving operations including:
a first driving operation in which a potential of the first electrode is made lower than a reference potential, a potential of the second electrode is made higher than the reference potential, and a potential of the opposite electrode is made higher than the reference potential,
a second driving operation in which the potential of the first electrode is made higher than the reference potential, the potential of the second electrode is made lower than the reference potential, and the potential of the opposite electrode is made higher than the reference potential, a third driving operation in which the potential of the first electrode is made lower than the reference potential, the potential of the second electrode is made higher than the reference potential, and the potential of the opposite electrode is made lower than the reference potential, a fourth driving operation in which the potential of the first electrode is made higher than the reference potential, the potential of the second electrode is made lower than the reference potential, and the potential of the opposite electrode is made lower than the reference potential, and wherein an absolute value of a difference in potential between the first electrode and the common electrode is equal to an absolute value of a difference in potential between the second electrode and the common electrode.

2. The liquid crystal display device according to claim 1, wherein an absolute value of a difference in potential between the opposite electrode and the common electrode is constant.

3. The liquid crystal display device according to claim 1, wherein a potential of the common electrode is equal to the reference potential.

4. The liquid crystal display device according to claim 1, wherein a potential of the common electrode is constant.

5. The liquid crystal display device according to claim 1, further comprising:
an overcoat layer formed to cover the opposite electrode.

6. The liquid crystal display device according to claim 1, further comprising:
the plurality of pixels arranged in a matrix,
wherein the first electrode and the second electrode are formed in each of the plurality of pixels,
wherein the opposite electrode is formed for each row of the plurality of pixels, and
wherein the driving unit executes the driving operations for each row of the plurality of pixels.

7. The liquid crystal display device according to claim 6, further comprising:
a gate line formed for each said row of the plurality of pixels,
wherein the first electrode and the second electrode formed in one of the plurality of pixels are electrically connected to one of the gate lines through respective switching elements.

8. The liquid crystal display device according to claim 1, wherein the driving unit executes the first driving operation, the second driving operation, the third driving operation, and the fourth driving operation in that order.

9. The liquid crystal display device according to claim 1, wherein the driving unit executes the first driving operation, the third driving operation, the second driving operation, and the fourth driving operation in that order.

10. The liquid crystal display device according to claim 1, wherein the unit period has two frame periods.

11. A method of driving of a liquid crystal display device having a plurality of pixels, the liquid crystal display device including a first substrate, a first electrode formed on the first substrate in each of the plurality of pixels, a second electrode formed on the first substrate in each of the plurality of pixels, a second substrate disposed so as to face the first substrate, an opposite electrode formed on one of the first and second substrates, the opposite electrode being shared by at least some of the plurality of pixels, a common electrode formed on another of the first and second substrates, the common electrode being shared by the plurality of pixels, and a liquid crystal layer sandwiched between the first and second substrates, the method comprising:

executing a first driving operation in which a potential of the first electrode is made lower than a reference potential, a potential of the second electrode is made higher than the reference potential, and a potential of the opposite electrode is made higher than the reference potential;

executing a second driving operation in which the potential of the first electrode is made higher than the reference potential, the potential of the second electrode is made lower than the reference potential, and the potential of the opposite electrode is made higher than the reference potential;

executing a third driving operation in which the potential of the first electrode is made lower than the reference potential, the potential of the second electrode is made higher than the reference potential, and the potential of the opposite electrode is made lower than the reference potential; and executing a fourth driving operation in which the potential of the first electrode is made higher than the reference potential, the potential of the second electrode is made lower than the reference potential, and the potential of the opposite electrode is made lower than the reference potential, wherein the first driving operation, the second driving operation, the third driving operation, and the fourth driving operation are executed during a unit period, and wherein an absolute value of a difference in potential between the first electrode and the common electrode is equal to an absolute value of a difference in potential between the second electrode and the common electrode.

12. The driving method according to claim 11, wherein the liquid crystal layer includes liquid crystal molecules having positive birefringence.

* * * * *